United States Patent
Tan

(10) Patent No.: US 10,757,396 B2
(45) Date of Patent: Aug. 25, 2020

(54) ADDING NEW IMAGING CAPABILITIES TO SMART MOBILE DEVICE

(71) Applicant: Weining Tan, Mississauga (CA)

(72) Inventor: Weining Tan, Mississauga (CA)

(*) Notice: Subject to any disclaimer, the term of this patent is extended or adjusted under 35 U.S.C. 154(b) by 233 days.

(21) Appl. No.: 15/880,704

(22) Filed: Jan. 26, 2018

(65) Prior Publication Data

US 2019/0238825 A1 Aug. 1, 2019

(51) Int. Cl.

| | |
|---|---|
| *H04N 5/225* | (2006.01) |
| *H04M 1/725* | (2006.01) |
| *G02B 27/01* | (2006.01) |
| *H04N 13/282* | (2018.01) |
| *H04M 1/05* | (2006.01) |
| *H04N 13/218* | (2018.01) |
| *H04N 13/344* | (2018.01) |

(52) U.S. Cl.
CPC .......... *H04N 13/282* (2018.05); *G02B 27/01* (2013.01); *H04M 1/05* (2013.01); *H04M 1/72525* (2013.01); *H04N 5/2254* (2013.01); *H04N 13/218* (2018.05); *H04N 13/344* (2018.05); *H04M 2250/12* (2013.01); *H04M 2250/52* (2013.01)

(58) Field of Classification Search
CPC ................................................... H04N 13/282
See application file for complete search history.

(56) References Cited

U.S. PATENT DOCUMENTS

| | | | | |
|---|---|---|---|---|
| 6,608,996 B1* | 8/2003 | Laurikka | ............. | H04M 1/0279 340/7.55 |
| 7,400,917 B2* | 7/2008 | Wood | ................... | H04B 1/3888 455/575.1 |
| 8,862,183 B2* | 10/2014 | Kulas | .................. | H04M 1/0254 455/556.1 |
| 9,300,347 B1* | 3/2016 | Coverstone | .......... | H04B 1/3888 |
| 9,366,871 B2* | 6/2016 | Ghosh | ................ | G02B 27/0179 |
| 9,791,924 B2* | 10/2017 | Shiu | .................... | G02B 27/0172 |
| 9,804,402 B2* | 10/2017 | Choi | .................... | G02B 27/028 |
| 9,939,650 B2* | 4/2018 | Smith | .................... | G02B 27/028 |
| 10,108,228 B2* | 10/2018 | Jiang | .................... | G06F 1/1601 |
| 10,345,852 B2* | 7/2019 | Yang | ....................... | G06F 1/163 |

(Continued)

*Primary Examiner* — Irfan Habib

(57) ABSTRACT

The disclosure presents novel methods and apparatuses to add new imaging functions to an existing smart device, comprising a plate accessory with one or more optical components that is attached to the smart device. The plate can be rotated to the front of the screen and supported at more than one sides of the smart device. The imaging function added could be a virtual reality viewer or a wide light field camera. The plate can also be worn on one's head by self-contained retractable brace, stands and strap. If the plate is moved close to the smart device's cameras, the optical components can form multiple images from multiple viewing angles of the scene onto the camera sensor. The captured images can be used to generate stereoscopic 3D or light field 4D recording of the scene by computational photographic algorithms. The attaching accessory is very light, portable, flexible, affordable and easy to use. Compared to the competitive methods, the present disclosure is a smallest wearable virtual reality smartphone case viewer that can be carried in pockets, and a method and apparatus to enable existing traditional phone cameras to capture light field 4D images and videos.

20 Claims, 18 Drawing Sheets

(b)

(56) References Cited

U.S. PATENT DOCUMENTS

| | | | |
|---|---|---|---|
| 10,359,545 B2* | 7/2019 | Smith | G02B 3/08 |
| 10,394,315 B2* | 8/2019 | Yang | G06F 3/011 |
| 10,409,079 B2* | 9/2019 | Dewald | G02B 27/0172 |
| 2011/0090626 A1* | 4/2011 | Hoellwarth | G06F 1/1626 |
| | | | 361/679.01 |
| 2012/0052929 A1* | 3/2012 | Thammasouk | G06F 1/1626 |
| | | | 455/575.1 |
| 2012/0194448 A1* | 8/2012 | Rothkopf | G06F 3/0482 |
| | | | 345/173 |
| 2012/0320340 A1* | 12/2012 | Coleman, III | A61B 3/10 |
| | | | 351/208 |
| 2014/0354782 A1* | 12/2014 | Lowry | G02B 30/35 |
| | | | 348/49 |
| 2015/0085184 A1* | 3/2015 | Vidal | H04N 5/2252 |
| | | | 348/376 |
| 2015/0103152 A1* | 4/2015 | Qin | G02B 27/0176 |
| | | | 348/53 |
| 2015/0229745 A1* | 8/2015 | De Wind | H04M 1/026 |
| | | | 455/575.8 |
| 2016/0054759 A1* | 2/2016 | Lee | G06F 1/1683 |
| | | | 361/679.28 |
| 2016/0246559 A1* | 8/2016 | Jung | G06F 3/1431 |
| 2016/0301785 A1* | 10/2016 | Espinoza | H04M 1/72575 |
| 2017/0084231 A1* | 3/2017 | Chew | G06F 1/1686 |
| 2019/0058828 A1* | 2/2019 | Russi-Vigoya | H04N 5/23238 |

* cited by examiner (a)

(b)

(a)

(b)

(c)

ADDING NEW IMAGING CAPABILITIES TO SMART MOBILE DEVICE

CROSS-REFERENCE TO RELATED APPLICATION

This application claims the benefit of U.S. Provisional Patent Application No. 62/458,549, filed Feb. 13, 2017. The entire disclosure of the above application is incorporated herein by reference.

FIELD OF THE INVENTION

The present disclosure is in the field of digital imaging, digital camera, smart mobile device, digital image processing, 3D, 4D light field data capturing and processing, virtual reality digital display and optics.

BACKGROUND

The mobile computing on smartphones, tablets and other smart mobile devices had become an increasingly important part of people's daily live. Smart mobile devices were getting more and more portable and powerful. People wanted to integrate as many as functions they needed into their smart devices so they can only carry one device. For example, high resolution screen, email, calendar, internet, messaging, GPS based map service, position sensor, voice recording, near field communication, finger print reader, as well as advanced camera for image and video capturing. By making smart device multi-functional, people gradually moved away from needing many previously dedicated devices, like point-and-shoot cameras, camcorders, radios, music players, TVs, and even laptop computers.

Almost all smartphones were equipped with cameras. The mobile cameras were getting more and more powerful. Not only did the number of image pixels increase greatly, but also the advanced features like auto-focusing, larger size CMOS sensors, high dynamic range, stronger flash lights, and better camera lenses were added in. Most high-end smartphones now had two cameras—a front camera and a back camera. There were tons of apps strived to improve mobile image or video capturing. They tried to improve the capturing process, for example, to make it easier and quicker to use, add more functions during the capturing, improve the captured image or video quality. One example to improve the content quality was to provide a set of digital filters to post process the captured images or videos. Among those the very successful companies were Instagram and Socialcam.

Instagram provided a simple way to capture and share mostly 2D still images. It also provided a lot of build-in filters and visual effects software to customize user photos. Socialcam provided the easiest way to capture, share and view 2D videos. It also provided user video filters, cloud storage and other video sharing services.

Beside 2D images and videos, there were a few smartphone cameras could be used to capture 3D and higher dimensional light field images or videos. The stereoscopic 3D images were actually two regular 2D images taken with a binocular offset that corresponded to the distance between human's two eyes. Stereoscopic 3D images could create or enhance the illusion of depth by means of stereopsis.

One typical solution named "3D Camera" let you manually control the binocular shifting to take two separate images sequentially using existing single 2D mobile camera to get the 3D image pair needed for stereoscopic 3D. It was actually a software solution as a mobile app. Here, a mobile app, short for mobile application, or just app, was application software designed to run on smartphones, tablet computers and other smart mobile devices to realize all those smart functions. Apps had become very popular so the newer smartphones were nicknamed "app phones" to distinguish them from earlier less-sophisticated smartphones. Study showed that more mobile subscribers used apps than browsed the web on their devices because apps were normally more correlated to the user, location and time, and more efficient for the specific functions.

The problems of the above software 3D camera were (1) two images were taken at the different time, as long as there was a relative movement from the scene objects to camera, the artifacts were inevitable; (2) it was slow and difficult to use due to manual shifting and registration control. Another solution was called "Poppy 3D". It provided a bulky plastic housing of your phone for both 3D capturing and viewing. It used a set of fixed mirrors to capture two stereographic images using smartphone's single camera. The third example solution was "3D cone". It used single mirror stereopsis method with a bulky plastic cone shaped mirror to divide the smartphone back camera image into left and right images. Both "poppy 3D" and "3D cone" solutions were not considered portable, and the image resolution would be less than half of the mobile camera's original resolution and viewing area. But the two images could be captured at the same time so quality is better than the software solution. The fourth solution was like "sthreem 3D" add-on system. It required a separate camera device that needed to attach to the mobile's interface port and work together with the build-in mobile camera to provide 3D capturing. The problem was expensive, power consuming and inconvenient to use. The last solution was called "3D scanner". It was pure software solution that required mobile camera scanning a scene object constantly for a period of time, so it could acquire the image information at different angle and finer detail, and create a 3D model shape. The big problem was that it was very slow, so during the scanning time, any object movement would cause huge artifact in the final result. The quality was fairly low.

The last solution was to embed stereoscopic camera hardware directly inside the smartphone. The examples were HTC EVO 3D phone and LG Optimus 3D P920 phone. They all had a pair of matching mobile camera sensors for dedicated stereoscopic image and video capturing. However due to the same problems like adding cost, more power consumption, low sensor quality and inconvenience to use, the solution could not get popular enough to encourage the manufacturers continuing the product lines.

Virtual reality was the next big thing after 3D, 4K and mobile computing. 2016 was a pivot year for massive adaption of virtual reality technology. This included virtual reality content generation and display. Virtual reality (VR) referred to computer technologies that used software to generate realistic images, sounds and other sensations that replicated a real environment (or create an imaginary setting), and simulated a user's physical presence in this environment, by enabling the user to interact with this space and any objects depicted therein using specialized display screens or projectors and other devices. VR had been defined as " . . . a realistic and immersive simulation of a three-dimensional environment, created using interactive software and hardware, and experienced or controlled by movement of the body" or as an "immersive, interactive experience generated by a computer". Not only did Virtual reality let people see a 3D scene but also enabled them to look around and see a complete 360 degree in horizontal (360H) and 180 degree in vertical (180V) of the scene for every viewing location.

There were two ways to get a virtual reality content that contained a complete 360H+180V degree 3D information for every viewing location—one was using game engine to create a complete set of 3D models of all scene objects; then the computer generated a 2D projected image frame for each of the viewing position in real time. This was called CG content. For example, all VR games and 3D animation movie data. Another way was using a special camera to capture and store the light field information of the real scene. This was called live action content. The light field was a vector function that described the amount of light flowing in every direction through every point in space. The direction of each ray was given by the 7D plenoptic function, and the magnitude of each ray was given by the radiance. The camera that could capture 7D light field information was called light field camera.

There was yet smartphone equipped with a light field camera. This was because of the optical and electronic limitation in a smartphone form factor and the computation power for light field data processing in current mobile devices. Some early companies were working on a type of light field camera for mobile based on integral photography (IP). Integral imaging was an autostereoscopic and multi-scopic three-dimensional imaging technique that captured and reproduced a light field by using a two-dimensional array of microlenses, sometimes called a fly-eye lens, normally without the aid of a larger overall objective or viewing lens, and putting it in front of a camera CMOS sensor. These technologies required a special light field mobile camera module being built into the smartphone. So, if an existing smartphone user needed to capture a light field content, he or she must buy a new smartphone.

Once a virtual reality content was generated, people needed a way to view it. A typical virtual reality viewer comprised a formation of two convex lenses that were put in front of a 5 to 6 inches wide digital display screen so that each eye looked at one half of the display through a lens respectively. The head position and viewing direction was tracked and the display was updated in real time accordingly.

Currently there were three ways to make this happen. The first way was to have a head mount lens box with digital display screens and position sensors built in. The head mount lens box was tethered to a personal computer. The position sensors normally referred to GPS, gyro and accelerometer sensors. The personal computer received the position sensors data from the head mount box, and handled all the computation and render out each frame of the virtual world. The rendered frames were sent to the head mount box for display. Since the computation and rendering happened in the relatively powerful personal computer, the virtual reality content display quality was the best.

The second way is to use a smartphone for both rendering computation and display. There was also a head mount lens box with or without position sensors. The smartphone could be put inside the box. If the box had position sensors, which were normally more accurate than those in the smartphone, then the sensors data was transmitted to the smartphone. Otherwise the smartphone internal position sensors data was read out. The smartphone handled all the computation and rendered out each frame of the virtual world and displayed it to the smartphone screen for display. Since the computation and rendering happened in the phone, the quality was normally the worst.

The third way was a compromise of the above two methods. A dedicated embedded computing device, a set of position sensors, and a pair of display screens were used in the head mount box. The computing device, position sensor and display screens normally had better performance than those in the smartphone. The sensors detected user's head positions and sent the measured data to the dedicated VR computing device. The computing device handled all the computation and rendered out each frame of the virtual world and sent it to the display screen for display. Since the computation and rendering happened in the dedicated better computing device, the quality was normally higher than the smartphone solution and lower than the PC solution.

All the above wearable solutions of virtual reality content viewing required a fairly large, heavy and inconvenient head mount box worn on user's head. Not only was the wearing being uncomfortable, for example, many of the head mount VR viewers could not accommodate prescription glasses very well and made people who wore glasses feeling uncomfortable in viewing virtual reality contents, sometimes steamy on lenses and blurry in images, but also no matter what material the head mount box was made of, they were normally too big and heavy to carry conveniently in pockets or bags. If the virtual reality box was a separate item to pocket besides smartphone, people would feel inconvenient and became reluctant to carry or forgetting to bring it with them all the time. In the end people would not be able to enjoy virtual reality contents at anywhere and at anytime even they selected mobile VR solution. Same problems were also with mobile virtual reality cameras. There is yet a solution of a universal light field camera for all smart devices.

The present disclosure provides the method or apparatus to add new imaging functions to an existing smart device: (1) to turn any smartphone with gyroscope sensor into an extremely portable and highly available wearable virtual reality content viewer by overcoming the above-mentioned limitations; (2) to achieve stereoscopic 3D, wide field virtual reality and light field 4D virtual reality image and video capturing by using existing hardware without requiring a new smart device. The two methods could be implemented into one apparatus so people can achieve both purposes in one device.

SUMMARY

The disclosure presents novel methods and apparatuses to add new imaging functions to an existing smart device, comprising a plate accessory with one or more optical components that is attached to the smart device. The plate can be rotated to the front of the screen and supported at more than one sides of the smart device. The imaging function added could be a virtual reality viewer or a wide light field camera. The plate can also be worn on one's head by self-contained retractable brace, stands and strap. If the plate is moved close to the smart device's cameras, the optical components can form multiple images from multiple viewing angles of the scene onto the camera sensor. The captured images can be used to generate stereoscopic 3D or light field 4D recording of the scene by computational photographic algorithms. The attaching accessory is very light, portable, flexible, affordable and easy to use. Compared to the competitive methods, the present disclosure is a smallest wearable virtual reality smartphone case viewer that can be carried in pockets, and a method and apparatus to enable existing traditional phone cameras to capture light field 4D images and videos.

DETAILED DESCRIPTION

Figure 1:
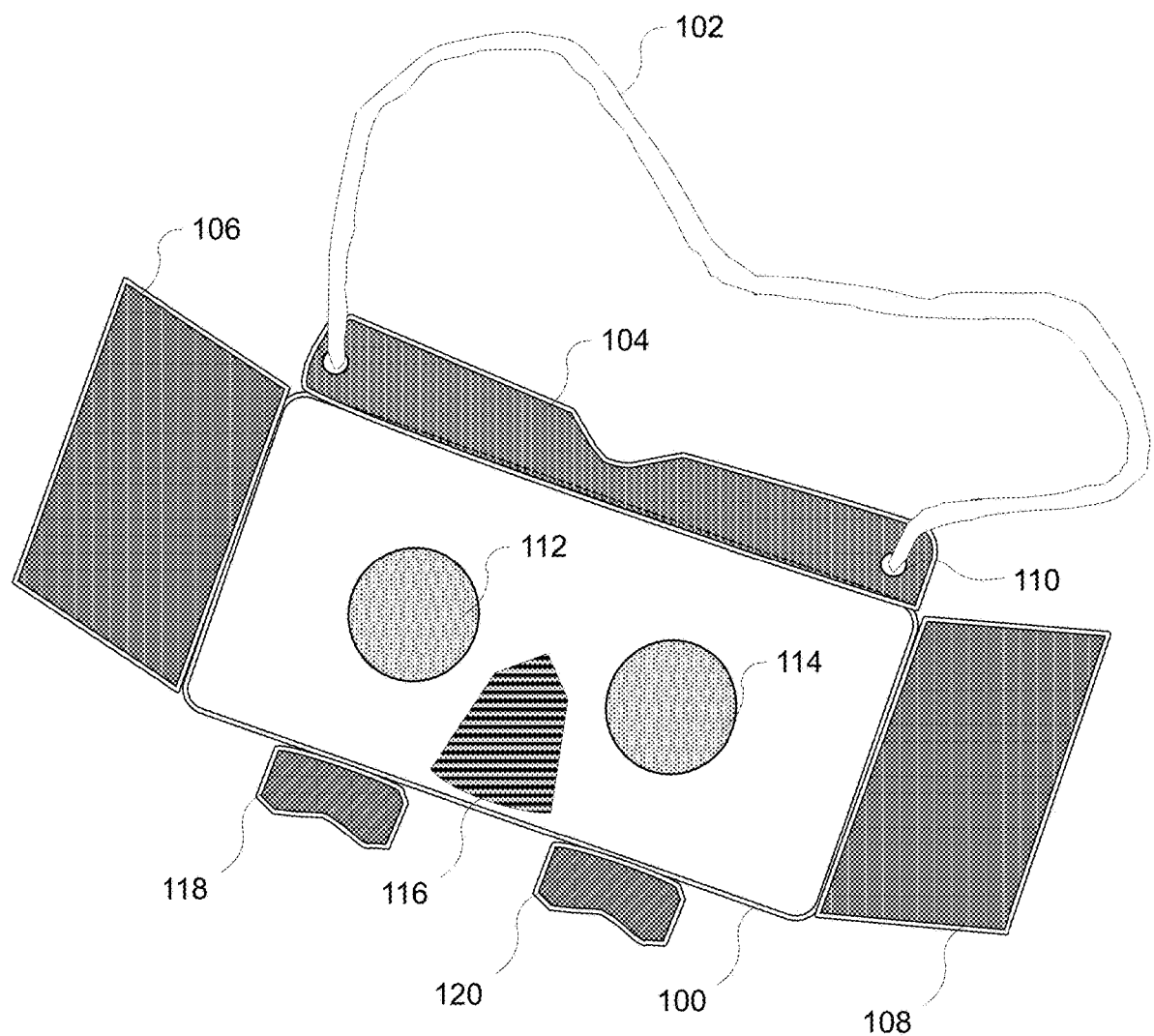
FIG. 1 illustrates a preferred wearable design embodiment of the present disclosure in drawing.

The disclosure presents a set of methods and apparatus designs to add new imaging functions to an existing smart device. The smart device includes but not limited to smartphones, tablets, ultra-portable computers, as well as any mobile or portable device that has digital display screen and at least one imaging sensor. The methods and accessory designs presented in this disclosure will serve for exemplary purpose but not be regarded as limited to those examples. The exemplary methods and accessory designs and all other possible variants obvious to the ordinary skilled in the art are intended to take advantage of the existing digital display screen and digital cameras in a smart device to efficiently process advanced media data that includes but not limited to images and videos.

The methods basically involve a portable accessory that can be attached to a smart device. In one preferred embodiment of the present disclosure, the accessory mainly comprises a convertible plate that can be moved to various positions around the smart device; and at least an optical component that is included as a part of the plate. One example of such accessory is in a form factor of a smart device protective case. The case can serve simultaneously as device protection as well as adding new imaging functions intended. In this scenario, user is often carrying the accessory all the time until he or she removes the case from the device. Another example of such accessory is an easily removable and attachable design that the accessory is only attached to the device when user needs the new imaging function. At other time the accessory is detached from the device and may or may not be carried with the user.

In most situations the attaching accessory is supposed to be very light in weight, very portable and have small footprint. The material can be chosen from but not limited to plastic, silicon, aluminum, and carbon fiber polymer or titanium alloy. Most of the designs are economic in price but durable enough so very affordable. The designs also make it very flexible and very easy to use. All exemplary designs will be described and illustrated in the later sections and figures of the present disclosure.

The present disclosure describes a general hardware framework that many new digital imaging and other features can be easily added in or replaced the accessory. A new feature or function can become available by swapping a specific part of the accessory and keeping the common accessory modules. The specific accessory part is for the dedicated new imaging function; the common accessory module part can be used for all new imaging functions.

The present disclosure will describe two big categories of the new imaging functions. The first is mainly to take advantage of the existing smart device screen for advanced digital display features; the second is to take advantage of the existing smart device cameras for advanced digital capturing features. And the exemplary application area of the above two categories of new imaging functions is in high dimensional imaging, such as virtual reality and hologram. However, these specific categories of the new imaging functions and the applications presented in this disclosure will serve only for exemplary purposes but shall not be regarded as limited to only those examples. The exemplary categories and applications and other possible variants obvious to the ordinary skilled in the art are also covered in the present disclosure.

In a preferred embodiment of the present disclosure, the plate may be installed initially at the back of the smart device. The plate can be moved or rotated from the back of the device to the front of the device screen. When the plate is positioned parallel to the screen surface, it is then locked in place by a structure that supports the plate securely at two or more sides of the smart device. For example, two sides could be the two opposite longer sides of the device. The accessory extends two posts from the two sides and supports the plate into the desired position. Supports at three or four sides of the device could also be used. Support at only one side of the device is often unreliable and should be avoided. Once the plate is in its open position, the new imaging function is realized by the included optical component(s) interact with the device display screen. After the use, the plate can be unlocked and reverted to the initial installed position at the back of the smart device.

A first exemplary application is an accessory working with the existing smart device display screen to provide virtual reality content viewing function. In one embodiment of the present disclosure, the optical components included in the plate are two convex lenses. Once the lenses and plate are switched from the back to the front of the screen, user's left eye looks through the left convex lens and right eye looks through the right convex lens, the virtual reality content is displayed on the screen in a way that the left eye image is displayed on the left half of the screen and the right eye image is displayed on the right half of the screen. The smart device tracks user's head position and angles in real time then refreshes the screen display according head position immediately, therefore user can feel as if he or she is looking around inside a virtual world. The accessory serves as a virtual reality viewer.

In a slightly different embodiment of the above user case, the accessory plate can also be worn on user's head. The plate contains a retractable brace that can be opened and supported on user's forehead. It also contains a nose rest that is supported on user's nose tip. There is also a soft elastic strap whose two ends are connected to the two ends of the forehead brace. The strap can wrap around user's head to secure the plate at the front of user's eyes. Since the plate has been already locked down at the front of the smart device screen, the whole smart device can now be worn at the front of user's eyes as a headset viewer. In an alternative embodiment of the present disclosure, there are two retractable cheek stands can be opened and supported on user's left and right cheeks. The cheek stands along with the head strap support the most of the weight from the smart device and the plate.

A second exemplary application is an accessory working with the existing smart device screen to provide hologram content display function. In one embodiment of the present disclosure, the optical components included in the plate are four pieces of trapezoid shaped transparent or translucent material. The material is normally glass, plastic or acrylic, etc. It is obvious to the ordinary skilled in the art the other materials with the similar properties can also be used. The four trapezoid pieces form a pyramid shaped formation on the surface of the smart device screen. The hologram content can be displayed on the screen in a way that there is one displayed image from one viewing direction of a scene is reflected onto one side of the pyramid respectively. Since the reflected image is formed on a transparent surface, user will feel like the object is floating in the air and can be looked from multiple directions. The accessory serves as a hologram viewer.

A third exemplary application is an accessory working with the existing smart device cameras to provide high dimensional content capturing function. The smart device may have at least one, or two, or more cameras. High dimensional content includes but is not limited to stereoscopic 3D images and videos, multi-directional holograms, parallax motion-based holograms, 4D light field contents as well as wide-field, 360-degree 3D virtual reality images and videos.

Stereoscopic 3D image is a pair of 2D images that the first image is captured from the left eye point of view and the second image is captured from the right eye point of view. When the image pair are viewed by a user, the left image is viewed by user's left eye and the right image is viewed by user's right eye, a three-dimensional perception of the original scene can be established through stereopsis.

Multi-directional hologram is actually a set of images of an object that each is captured from a different orthogonal direction of the scene respectively. The number of directions N is from one to four or more. Then the images are displayed on a N-side transparent or translucent glass pyramid, each image is displayed on one side of the pyramid. User can then perceive a hologram of the object that is floating in the air.

Parallax motion-based hologram is actually a set of images of an object that each is captured from a set of directions of the scene in sequential. The captured images are then played back sequentially in a to-and-fro fashion. User can perceive a strong sense of depth through motion parallax—that is, objects at the different depth levels move at various speeds. A closer object moves faster than a further object.

In another preferred embodiment of the present disclosure, the plate may be installed initially at the back of the smart device. It can be moved to a location that is close to a mobile device camera. In one embodiment of the present disclosure, there is one optical component in the plate working with only one camera. Yet in another embodiment of the present disclosure, there are two optical components in the plate, the first optical component works with the first mobile camera; the second optical component works with the second mobile camera. The optical components could be but not limited to plane mirrors, curved mirrors, prisms, fisheye lens and other lenses. It is obvious to the ordinarily skilled in the art that other kinds of imaging optical components as well as different optical materials can also be used here. The different optical materials include but not limited to glass, crystal and plastic.

If the smart device has only one camera, the accessory also helps to use one camera sensor to capture stereoscopic images or videos. If the smart mobile device has total two cameras, the accessory device helps to direct lights from the same real-world scene to each camera for easy capturing 3D images and videos or enhanced 2D images and videos. If the smart mobile device has three or more cameras, our accessory can still help to use all available camera sensors to form 3D, or multi-view, or enhanced 2D images and videos.

The attaching accessory is light, portable, affordable, flexible and easy to use; the capturing process will be realtime and synchronized; therefore, the captured 3D media will be of the highest resolution and the best quality. The method and apparatus can also fallback to be used for single camera system or without the attaching accessory hardware. The disclosure also suggests a couple of novel stereoscopic 3D image and video viewer designs.

Compared to all other existing methods, the capturing process will be at the realtime speed, and the capturing of both eyes are always synchronized; therefore, the captured 3D media will be of the highest resolution and the best quality ever. The exemplary control flow and processing methods will be also described and illustrated in the later sections and figures of this disclosure.

When the optical component put close to the camera is designed with plenoptic feature that can form an array of images of the scene onto the same camera censor, the accessory achieves a light field camera. Each image in the array is from a slightly different angle of view. This can be achieved by linear or non-linear surface mirrors, prisms and lenses. Using lenses include but not limited to one or more wide field supper fisheye lenses. If the lens field of view is not wide enough, user can scan the scene from one direction to other directions in time sequence, and stitch all captured images to get a wider field of view. The widest view is 360 degree horizontally and 180 degree vertically. One special case is that there are more than one cameras in the smart device, for example, two cameras—one front camera and one back camera; each camera works with one plenoptic component in the accessory. If all cameras are capturing at the same time, the resulted viewing field is the combination of the two.

The disclosed method and apparatus can also fallback to be used without the attaching accessory hardware. There might be case when the attaching accessory is not available for use. This becomes a pure software solution. In case of only one camera in mobile is available for capturing, the software will guide user to use the same existing single camera to take one image at one time to form a 3D image pair and process the images to get the high-quality stereoscopic image pair for storage and display. This degenerated case will be mostly similar to some of the other solutions, but additional nice features can be added to greatly improve the process and quality. One of these features could be realtime user guidance. At the time user taking the second image, the software will real-timely track and detect the distortion and disparity, and display the correcting information on screen to guide user to take the best and right picture in the first place. Not only does this feature improve the 3D media quality, but also make the capturing process easy to use.

The present disclosure also describes the extended framework of media sharing system and social network ecosystem based on users using the disclosed technologies and capturing large amount media data. Because the present disclosure will make media capturing in mobile extremely easy and high quality, it will change people's media data capturing preference, viewing habit and information sharing landscape and social networking structure. The whole ecosystem built on this might greatly change people's life style.

The FIG. 1 illustrates a preferred wearable attaching accessory design embodiment of the present disclosure. More variants and alternative designs will be illustrated in the following sections and figures. The specific design described here is only for convenience in illustrating the basic idea of the invention but not to be regarded as a limitation to the design options. This includes the possible more elegant mechanical design variants to achieve the similar function purpose and the different shape, structure, color and material variants.

In the preferred wearable design embodiment of the present disclosure, the accessory comprises an attachable wearable plate 100. There are two optical components 112 and 114 included inside the plate 100. In one of the embodiments of the present disclosure, the two optical components and 114 are two convex lenses that are apart horizontally with a pupillary distance (PD). It is the distance between the pupils of two eyes. The pupillary distance of human eyes is ranging from 45 mm to 75 mm. Kids have smaller PDs than adults. The size of the plate is ranging from four inches to six inches in diagonal. 104 is forehead brace hinged to the top of the plate 100. The brace 104 can be opened up to form a right angle with the plate 100 surface. The opened brace 104 can support the accessory on user's forehead. The supporting edge of the brace 104 is smooth and flatten so it feels comfortable on skin. There is a notch in the middle of the supporting edge that ensures user's forehead skin can rest evenly onto the left and right sides of the brace. There are two strap holes at the both ends of the brace 104 respectively. An elastic strap 102 is attached by fastened both ends at the two strap holes of the brace 104. The strap is just long enough to be securely worn over an average sized head. When the brace 104 is in its closed position, it turns 90 degree inwardly around its hinges and lies flatly against the plate 100 with minimum gap between them. The strap 102 lies on the plate 100 around the optical component 114 and 112 and covered by the closed left flap 106 and the right flap 108. In an alternative embodiment of the present disclosure, the strap 102 can also be fitted tightly and stored around the outer rim of the protective case. So the cover flap 106 and 108 might not be needed any more.

There is a nose rest structure 116 between the two optical components 112 and 114. The nose rest can be used to support the accessory on user's nose. In one exemplary embodiment of the present disclosure, a fixed nose rest structure is contoured according to the shape of human nose tip and padded with smooth and soft material. Yet in another exemplary embodiment of the present disclosure, the nose rest structure is adjustable to different nose heights and/or sizes. In a third alternative exemplary embodiment of the present disclosure, the nose rest area is cut out to avoid touching with user's nose. A pair of supporting stands 118 and 120 is hinged on the bottom side of the plate 100. Both stands work similar to the forehead brace 104. The stands 118 and 120 can be opened up to form a right angle with the plate 100 surface. The opened stands 118 and 120 can support the accessory on user's left and right cheeks respectively. The supporting edges of the stands 118 and 120 are smooth and flatten so they are easy on face. When the stands 118 and 120 are in their closed position, they turn 90 degree inwardly around their hinges and lie flatly against the plate 100 with minimum gap between them.

A left flap 106 and a right flap 108 are also hinged on the left side and right side of the plate 100 respectively. Both flaps work similar to the forehead brace 104. The left flap 106 and a right flap 108 can be opened up to form an obtuse angle with the plate 100 surface. The opened left flap 106 and a right flap 108 can block user's peripheral vision on the left and right sides respectively. When the left flap 106 and a right flap 108 are in their closed position, they lie on the top of the closed forehead brace 104, nose rest 116, strap 102, and cheek stands 118 and 120. Both left flap 106 and a right flap 108 cover those internal details and leave a smoothed surface outside.

Figure 2:
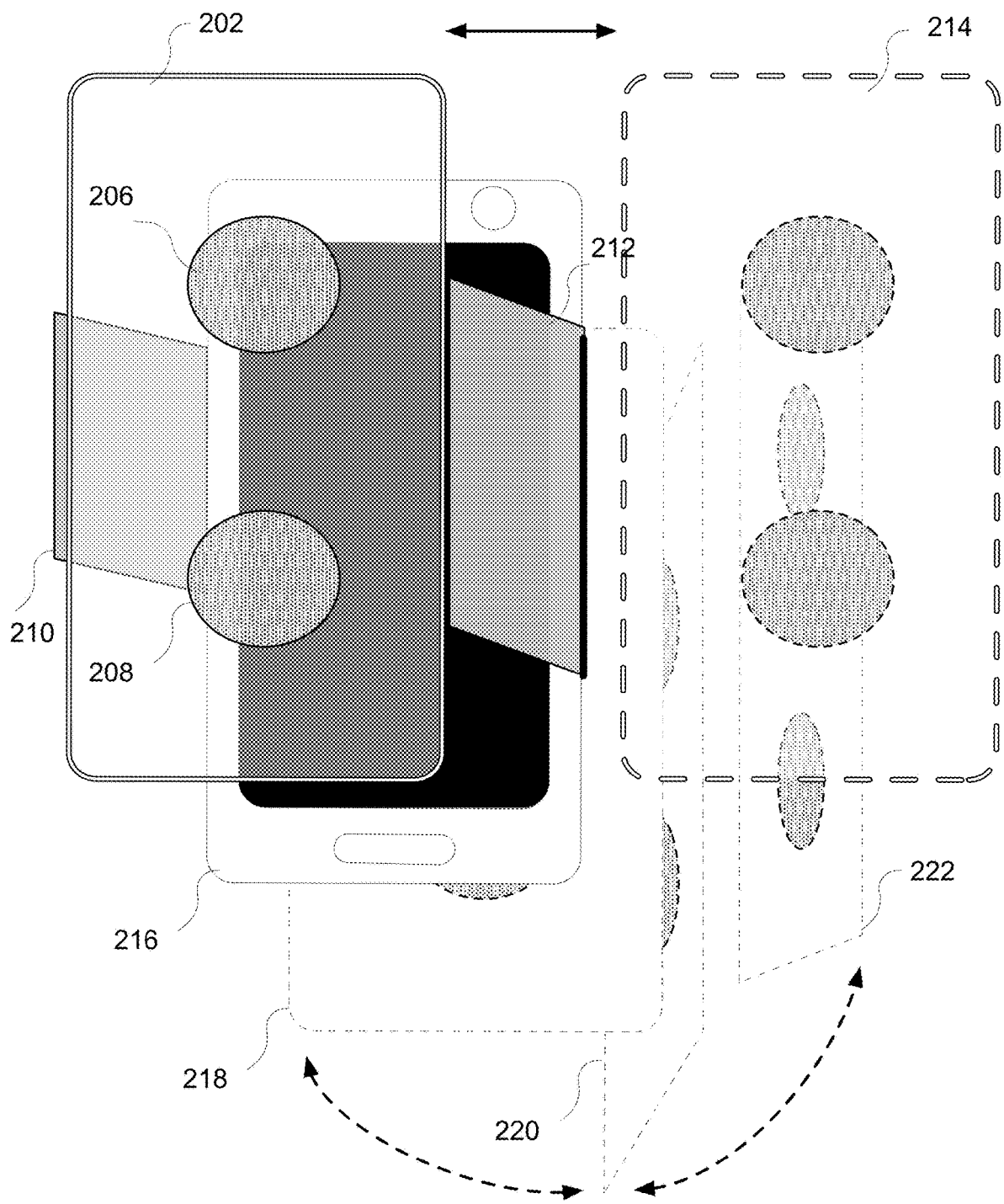
FIG. 2 illustrates a preferred plate design embodiment of the present disclosure in drawing.

FIG. 2 illustrates a preferred hand-held plate 202 design embodiment of the present disclosure. There are two optical components 206 and 208 included inside the plate 202. In one of the embodiments of the present disclosure, the two optical components 206 and 208 are two convex lenses that are apart horizontally with a pupillary distance (PD) at 60 mm. The size of the plate 202 is ranging from four inches to six inches in diagonal. There can be a nose cut between the two optical components 206 and 208. The nose cut is to avoid the plate 202 touching user's nose.

The solid line portion of the FIG. 2 illustrates the plate 202 in its opened position. The plate is opened at a distance above the smart device screen 216. Normally the distance from the plate 202 to the screen 216 equals to the focal length of the convex lenses 206 and 208. There is at least a first post 210 that supports the plate 202 on the first (left) side of the smart device 216; and a second post 212 that supports the plate 202 on the second (right) side of the smart device 216. The first side is on the opposite side of the second side. If the number of supporting posts is less than two the support might be unstable and the relative position of the plate 202 against the smart device 216 cannot be ensured. There can be more supporting posts on the other sides of the smart device 216, for example, on the top or bottom sides. In an alternative embodiment of the present disclosure, there could be more than one posts supporting on one side of the smart device 216. For example, the supporting post 212 splits into two posts with a gap between the two posts. All these posts are connected to the plate 202 and the smart device case with hinges. The hinges could be traditional mechanic hinges or living hinges using modern materials.

The dash line portion of the FIG. 2 illustrates different positions that the plate 202 can be rotated to around an edge of the smart device 216. Position 214 is the plate 202 shifting to the right side of the smart device 216 around the right edge of the smart device 216. The position 222 is the plate 202 in position 214 on the right side continuing to rotate 45 degrees towards the right back side of the smart device 216. The position 220 is the plate 202 in position 222 on the right back side continuing to rotate 45 degrees towards the back of the smart device 216. The position 218 is the plate 202 in position 220 on the back side continuing to rotate 90 degrees to be parallel to the smart device 216. The position 218 is the closed position of the plate 202 with all the supporting posts 210 and 212 collapsed and folded at the back between the device 216 and the plate 202.

Without loss of generality the rotating edge of the smart device can be on any side of the smart device. The plate can also be rotated from the closed position to opened position and from the opened position to closed position around one of the edges or around different edges.

Figure 3:
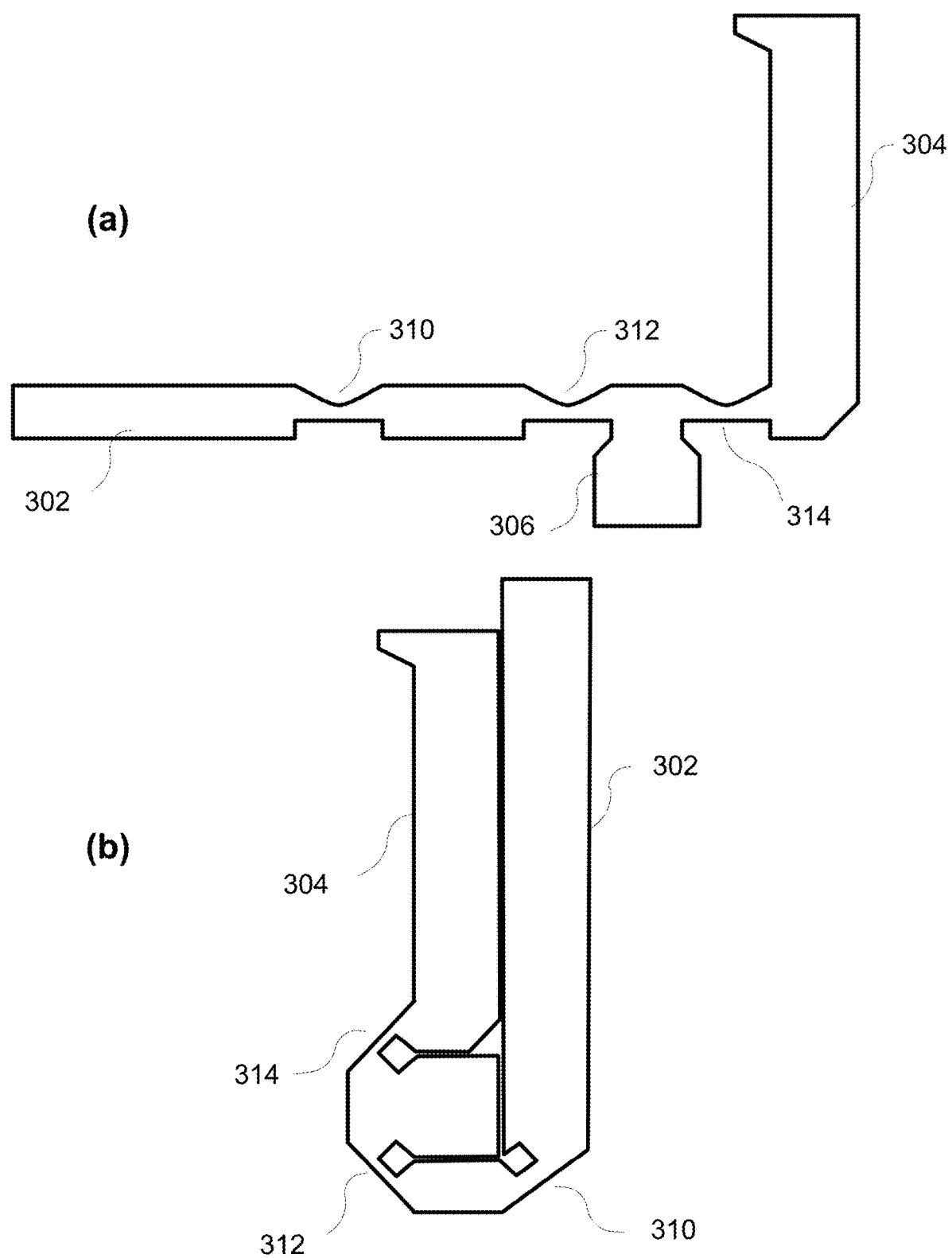
FIG. 3 illustrates an exemplary living hinge design embodiment of the present disclosure in drawing.

In one preferred embodiment of the present invention, the plate rotating edge comprises a living hinge. A living hinge has a thin flexible section of plastic that connects two thicker bodies together. Since it is very thin it enables the two bodies to move rotationally by angles of 180 degrees or more. Living hinge can be very durable and with good design may last for millions of uses. A familiar example would be a ketchup bottle cap. Polypropylene is the best material to make living hinges. The living hinge in the present invention is required to rotate 270 degrees for the plate to switch from the open position to the closed position and vice versa. A traditional living hinge design may work, like flat hinges or double hinges. FIG. 3 illustrates an exemplary new living hinge design embodiment of the present disclosure. The illustrated triple living hinge comprises three traditional single living hinges concatenated sequentially. The sub-Figure (a) illustrates the triple living hinge in its closed state. The sub-Figure (b) illustrates the triple living hinge in its open state. In the sub-Figure (a), 302 is the left side of the plate and 304 is the right side of the plate. The first traditional single living hinge is 310. The second traditional single living hinge is 312. The third traditional single living hinge is 314. There is a cubic shaped bar 306 between the second and third living hinges. For the triple living hinge to rotate 270 degrees, each of the sub living hinges only needs to rotate 90 degrees. The total rotation in fully opened state is illustrated in the sub-Figure (b). The left side 302 of the plate is rotated 270 degrees to align back-to-back against the right side 304 of the plate. The three sub-living hinges 310, 312 and 314 each rotates 90 degrees and wraps around the cubic bar 306. The bar 306 supports and ensures each sub living hinge only rotate up to 90 degrees so the wear and tear will be evenly distributed among all sub living hinges, therefore increases the overall life span of the triple living hinge.

Figure 4:
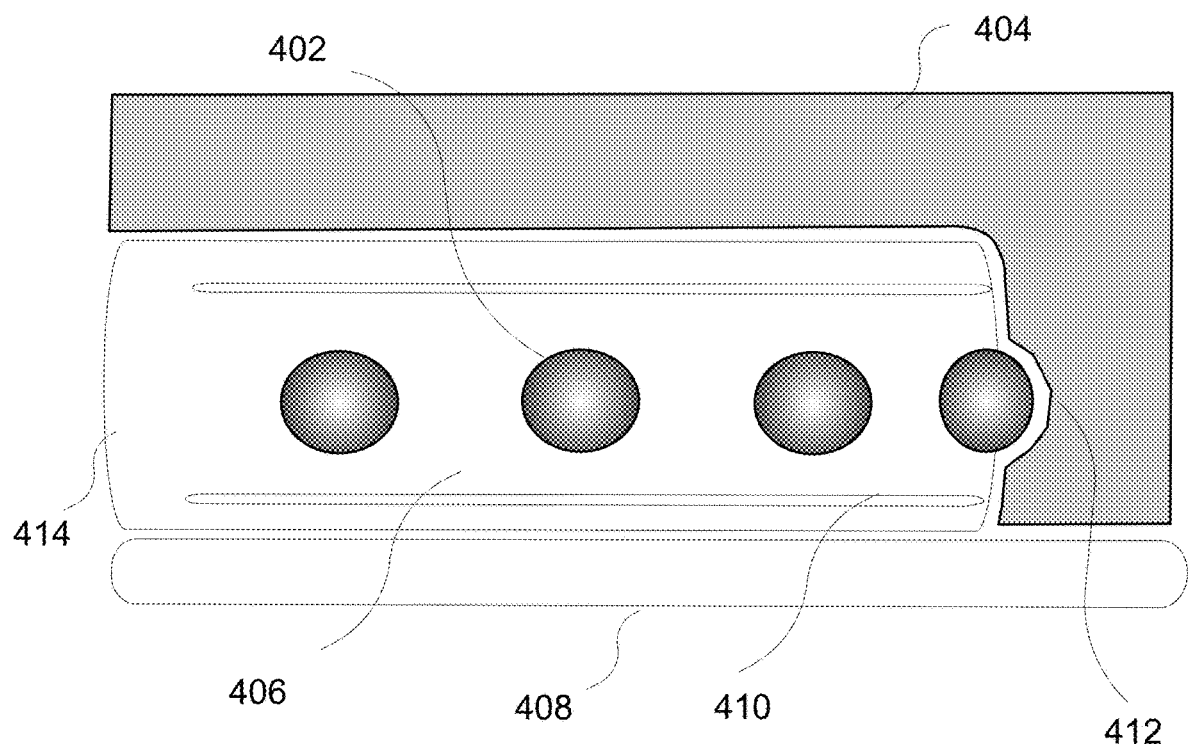
FIG. 4 illustrates an exemplary ribbon lock design embodiment of the present disclosure.
Figure 4:
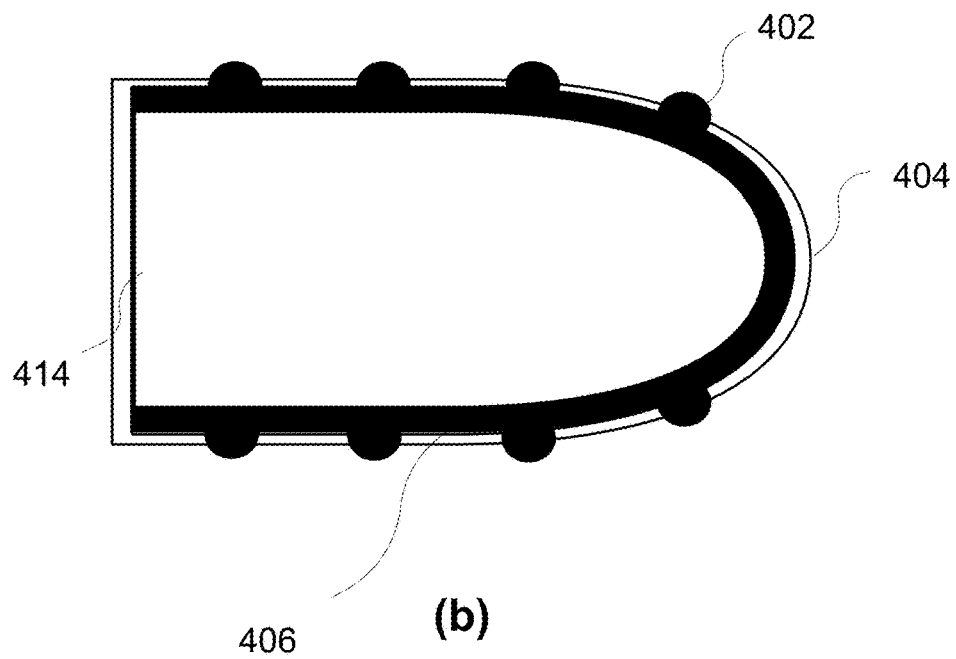

When the plate is in its closed position with the smart device, there needs a mechanism to reliably lock the plate onto the device or its case. FIG. 4 illustrates an exemplary ribbon based locking mechanism of the present disclosure. Without loss of generality the first side 408 of the locking mechanism serves as a bolting part, the second side 404 of the locking mechanism is a solid piece of material and serves as a nutting part. The first side 408 comprises a bolt piece 414. The second side 404 comprises a nut piece to tightly fit the bolt piece 414. On the bolt piece 414, the centre portion of the material 406 is cut out to form a ribbon that connects to the bolt piece 414 only at the two ends. The cutout area leaves a thin gap 410 at the top and bottom of the ribbon 406. There are small semi-sphere bumps 402 spread evenly along the ribbon 406 as shown in the FIG. 4. There are matching small semi-sphere dimples 412 on the second side 404 for each bump. This structure provides the ribbon 406 and small bumps 402 a strong and reliable flexibility to support the bolting and nutting piece to bite each other tightly. The locking is bi-directional. That is, the force needed to open and close the locking is symmetric. In an alternative design embodiment of the present disclosure, a set of vertical ribbons (or better called teeth) is used in place of the previous single horizontal ribbon. Each semi-sphere bump 402 is on each vertical ribbon (tooth). The gap between two adjacent teeth can be much larger in this design.

The sub-Figure (a) is a horizontal cross-section view of the locking structure. The sub-Figure (b) is a top cross-ssection view of the locking structure. This ribbon based locking structure can provide a good way to achieve long elastic ribbon in a tight footprint, therefore greatly improve the performance and the reliability of bi-directional locking.

Figure 5:
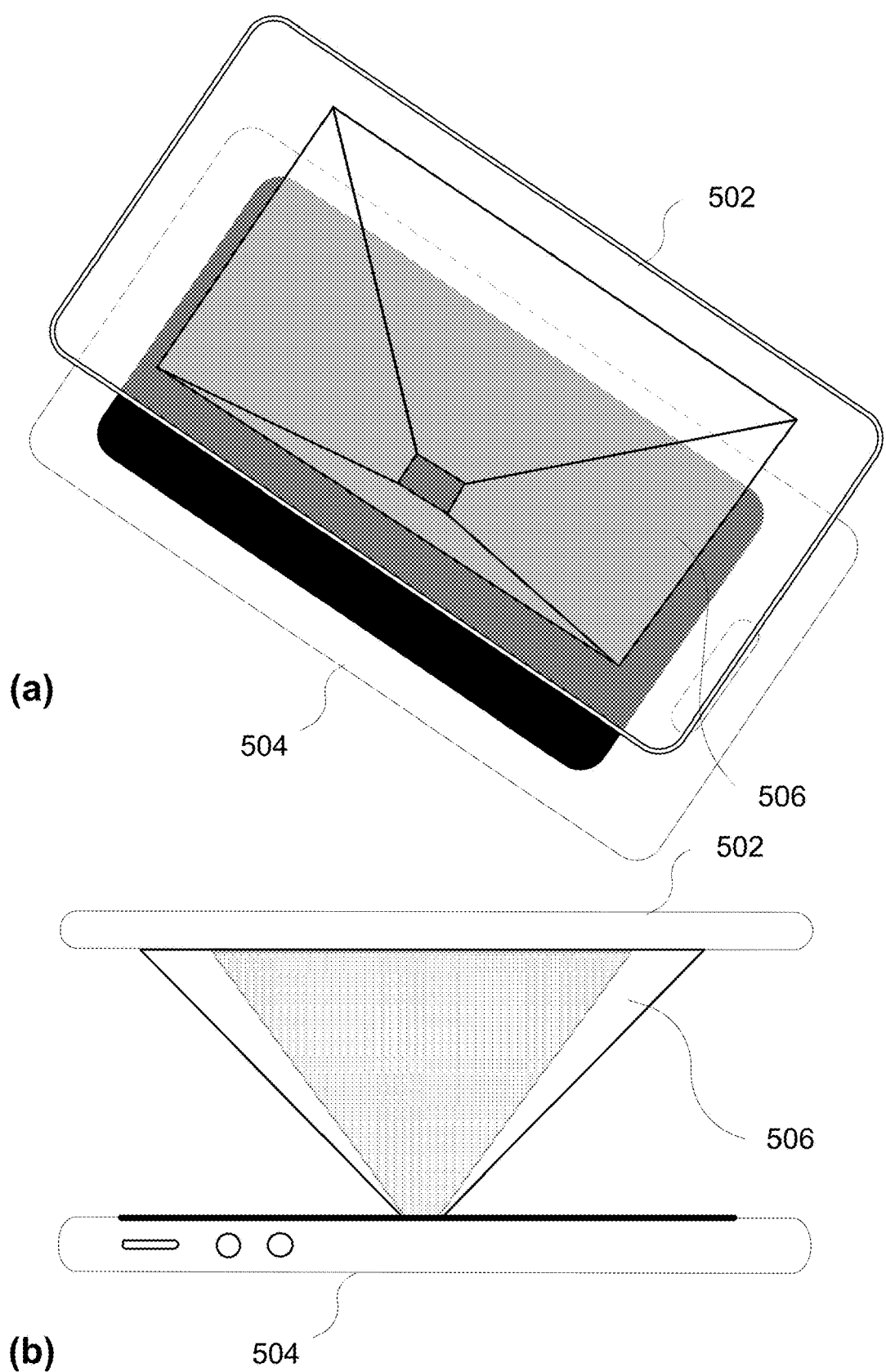
FIG. 5 illustrates an alternative design embodiment of the optical component that works as a holographic display.

FIG. 5 illustrates an alternative design embodiment of the optical component that works as a holographic display. Similar to the structure illustrated in FIG. 2, but the optical components included in the plate 502 are now four pieces of trapezoid transparent or translucent material 506. The transparent or translucent material may be but not limited to glass, crystal or plastic. The four trapezoid transparent pieces can make four side pieces of a square pyramid 502 when they are fully expanded from the closed position, and lie flat inside the plate when collapse. Once the plate 502 is opened up and rotated at the front of the smart device 504, a holographic pyramid 506 is formed between the plate 502 and the smart device screen 504 with the pyramid tip touching the screen and the large side of the pyramid located on the plate 502.

When the hologram images are processed in the smart device and displayed on the screen, the images emit light and are reflected on the first pyramid surface into user's eyes. User then perceives an object as if it is floating in the air. If user moves to another different viewing direction, he or she can see the reflected light from the second pyramid surface, so he or she perceives the object as three-dimensional. It is obvious to the ordinary skilled in the art that the number of pyramid sides could be one, two, three, four or a nature number greater than four.

Figure 6:
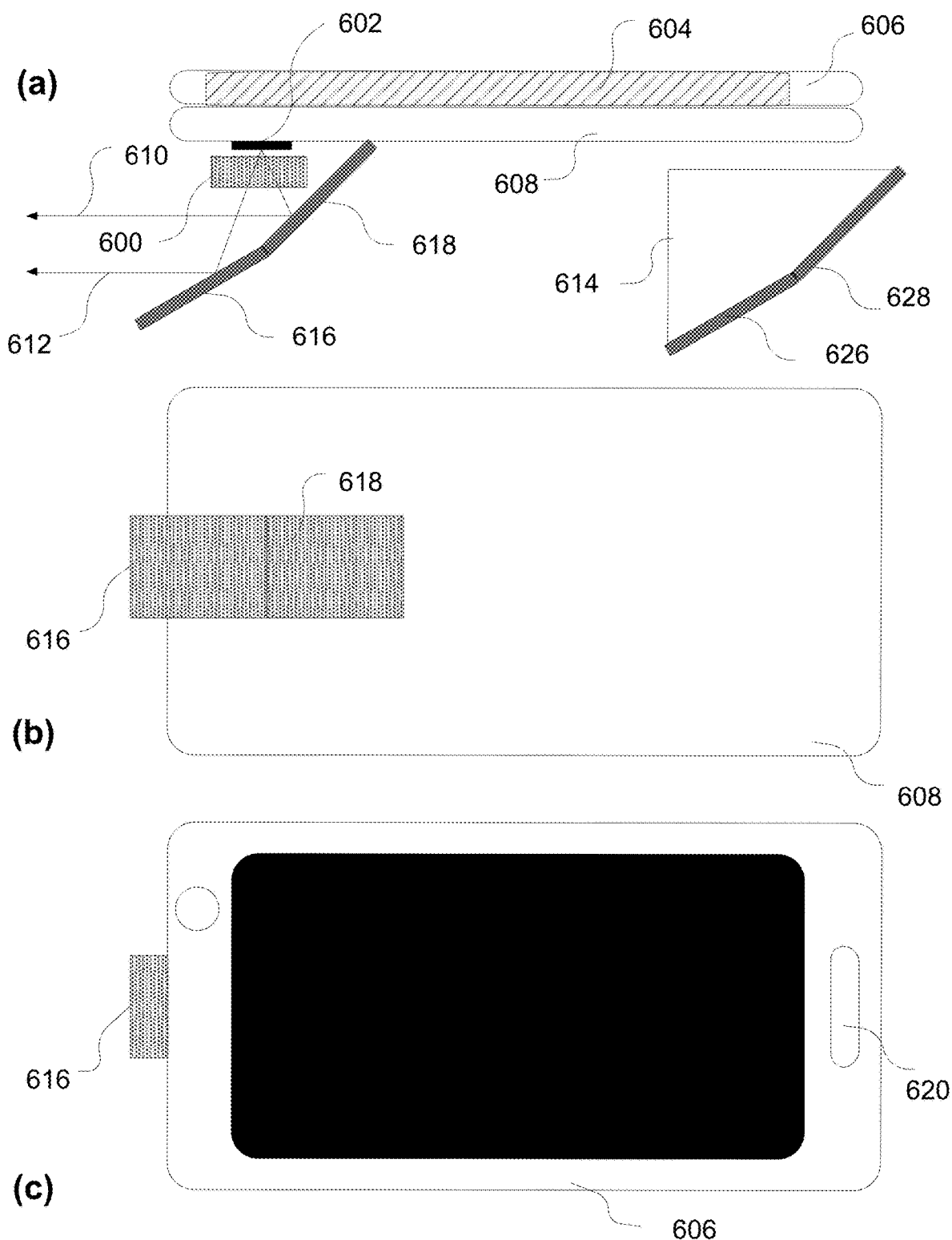
FIG. 6 illustrates an alternative design embodiment of the optical component that works as a single lens stereoscopic or light field camera in its opened position.

FIG. 6 illustrates an alternative design embodiment of the optical component that works as a single lens stereoscopic and light field camera in its opened position. In one embodiment of the present disclosure the optical components work with smart device camera as a stereoscopic 3D camera. The example smart device has a body 606 and a front display screen 604. There is a home button 620 on the body 606 under the screen 604; a front camera 622 above the front display screen 604. On the backside of the smart device there is another camera 602 called back camera. The back camera 602 and the front camera 622 may not be aligned in both vertical and horizontal direction. Without loss of generality and for the purpose of simplification, we assume the two cameras having a smaller vertical misalignment than the horizontal misalignment. This is actually the real-world case for the most popular iPhone and Galaxy S smartphones. It is just for convenience and exemplary purpose that in all Figures, the general smart device 606 was drawn like the shape or design of an Apple iPhone or Samsung galaxy S smartphone. But the intention of the illustration was to represent all applicable smart devices, for example, but not limited to smartphones, tablets, ultra-portable computers, and all other mobile device that is equipped with at least one imaging sensor.

The sub-Figure (a) illustrates the side view drawing from the left side of the smart device 606 with a preferred accessory plate 608 attached on its back. The attaching accessory 608 comprises a slim plate that can be securely attached to the smart device body 606 but leave all the function buttons, sensors, speakers, input ports, output ports and display screen unblocked. On the top part of the plate 608, the integrated optical component includes two first surface mirrors 616 and 618. The mirrors can be moved to an open position that the first mirror 618 is at a 45 degree angle with the back camera 602 so that the lights 610 can be reflected into the back camera 602 by the mirror 618; and the second mirror 616 is at the top of the first camera but a (45—delta) degree angle with the back camera 602 so that the lights 612 can be reflected into the back camera 602 by the mirror 616. One example of the delta is 15 degree in angle. When the mirrors 616 and 618 are in closed position, both mirrors are not in the optical pathway of the camera 602 so do not block the camera 602 at all. When both mirrors 616 and 618 are in open position, the camera 602 can capture two pictures of the same scene from two different viewing angles. The first picture has only a first half of the original camera resolution and the second picture has only a second half of the original camera resolution. These two images from the two different views can be used as a stereoscopic 3D image pair. When both mirrors are in closed position, the camera 602 can work as usual as if the attaching accessory were not installed.

In another embodiment of the present disclosure, the similar imaging function is realized by using prism instead of mirrors. A prism 614 as shown in the sub-Figure (a) with two reflective surfaces 626 and 628 replaces the previous optical device that comprises mirror 616 and 618 in the same location related to the smart device. The prism 614 can be moved to an open position that the first reflective surface 628 is at a 45 degree angle with the back camera 602 so that the lights 610 can be reflected into the back camera 602 by the reflective surface 628; and the second mirror 626 is at the top of the first camera but a (45—delta) degree angle with the back camera 602 so that the lights 612 can be reflected into the back camera 602 by the reflective surface 626. One example of the delta is 15 degree in angle. When the reflective surfaces 626 and 628 are in closed position, both reflective surfaces appear to camera 602 as completely transparent and do not block the camera 602 at all. In this way, when both reflective surfaces 626 and 628 are in open position, the camera 602 can capture two pictures of the same scene from two different viewing angles. The first picture has only a first half of the original camera resolution and the second picture has only a second half of the original camera resolution. These two images from the two different views can be used as a stereoscopic 3D image pair. When both reflective surfaces are in closed position, the camera 602 can work as usual as if the attaching accessory were not installed.

In an alternative embodiment of the present disclosure, a lens 600 is attached to the back camera 602 in place of the mirror pair and prism. It is obvious to an ordinary skilled in the art that any lens forming one or multiple images from a scene can be used here. Without loss of generality an exemplary wide-angle fisheye lens can be used to capture a virtual reality single shot that covers more than 180 degrees of the scene. In one exemplary embodiment of the present disclosure, the 235-degree advanced super fisheye lens is used. Yet in another embodiment of the present disclosure, a fisheye lens can work together with the mirror set 616 and 618 or the prism 614, so the captured wide field images are also 3D.

The sub-Figure (b) of FIG. 6 illustrates the same setups as described in sub-Figure (a) but now it is the back view from the backside of the smart device 606 and the plate 608. The optical components 616 and 618 are in open position provided the mirror solution is used. Only the backsides of mirrors 616 and 618 are visible. The back camera 602 is invisible from this view and will be visible if the mirrors 616 and 618 are switched to their closed position.

The sub-Figure (c) of FIG. 6 illustrates the same setups as described in sub-Figure (a) and their state is in open position but now it is the top view from the front side of the smart device 606. Provided the mirror solution is used. The back camera 602 is invisible. Only the top part of the opened mirror 616, smart device 606 and the home button 620 are visible in this drawing.

In one alternative embodiment of the present disclosure, the attaching accessory open or closed state and the mirrors in or out place can be designed having the following relationship. Once the accessory is in open position, all mirrors will automatically be put in open position; once the accessory is switched to closed position, all mirrors will automatically be put in closed position.

All mirrors mentioned hereafter are referred as highly reflective flat mirrors. For example, first surface flat mirrors. This is purely for describing convenience and exemplary purpose but not to be regarded as limit to only flat mirrors. In more general alternative embodiments of the present disclosure, the mirrors can be parabolic or other more complicated high order surfaces to increase the camera field of view.

Figure 7:
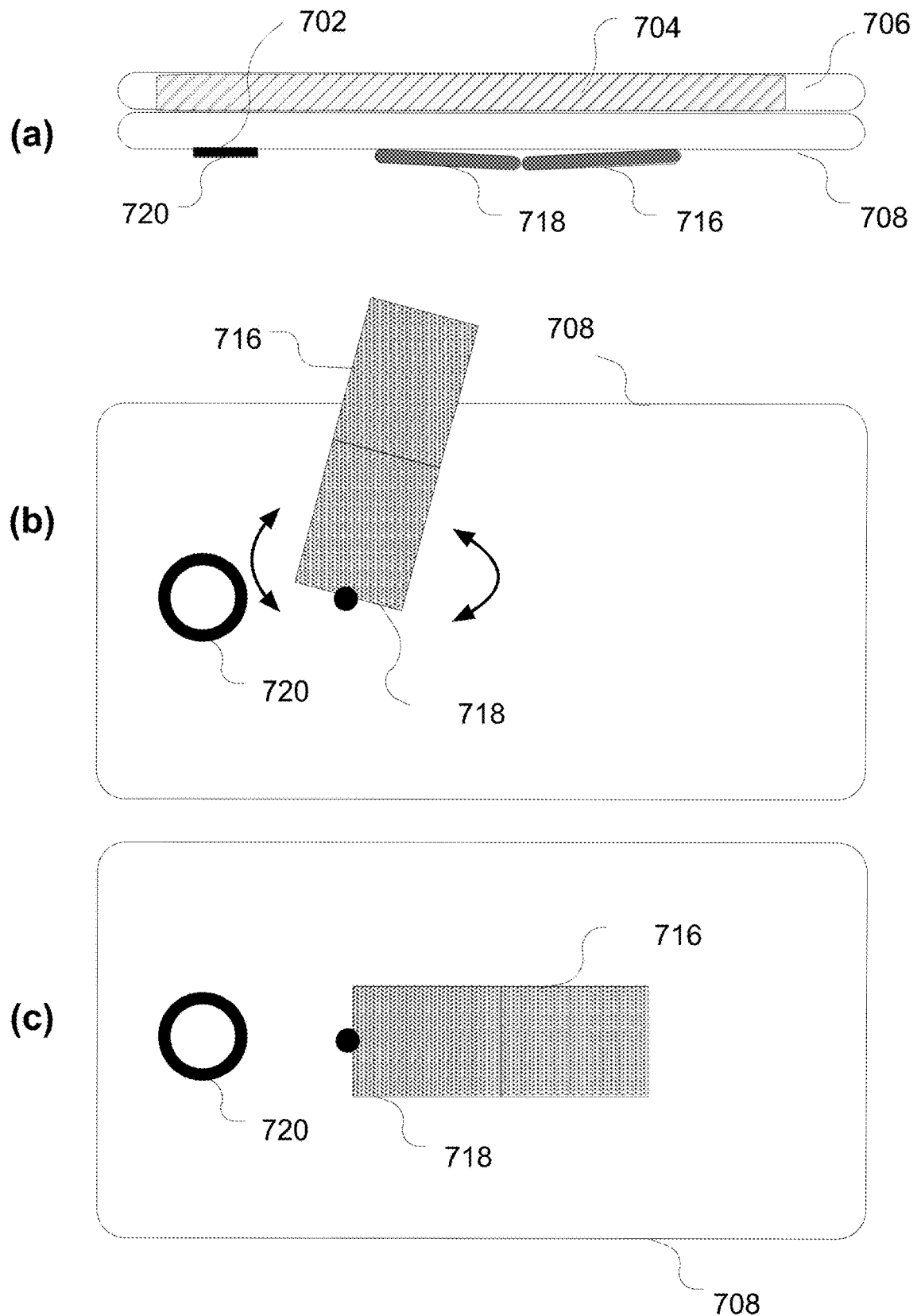
FIG. 7 illustrates an alternative design embodiment of the optical component that works as a stereoscopic or light field camera in its closed position.

FIG. 7 illustrates an alternative design embodiment of the optical component that works as a stereoscopic camera in its closed position. The example smart device has a body 706 and a front display screen 704. On the backside of the smart device there is a camera 720 called back camera. The sub-Figure (a) illustrates the side view drawing from the left side of the smart device 706 with a preferred accessory plate 708 attached on its back. The attaching accessory 708 comprises a slim plate that can be securely attached to the smart device body 706 but leave all the function buttons, sensors, speakers, input ports, output ports and display screen unblocked. On the top part of the plate 708, the integrated optical component includes two first surface mirrors 716 and 718. The mirrors can be moved to a closed position that the first mirror 718 is at a beta degree angle with the plate 708 and the second mirror 716 is at the top of the first camera but a -beta degree angle with the plate 708. In one example the beta is 7.5 degrees. That is, both mirrors 716 and 718 lie almost flat with the attaching plate 708, leaving very little footprint and unblocking the back camera 720. The camera 720 can work as usual as if the attaching accessory were not installed.

The sub-Figure (b) illustrates the backside view drawing of the said alternative design embodiment of the present disclosure. The example optical component—a stack of two first surface mirrors 716 and 718 are in the middle of rotating from the open position to the closed position. During the rotation the back camera 720 becomes unblocked and functional as if the accessory is not attached.

The sub-Figure (c) further illustrates the backside view drawing of the said alternative design embodiment of the present disclosure. The example optical component—a stack of two first surface mirrors 716 and 718 have rotated from the open position to the closed position. After the rotation the back camera 720 becomes unblocked and functional as if the accessory is not attached.

It is reasonable for an ordinary skilled in the art to use other slightly different ways to move the mirrors from the open position to closed position. It might not necessarily involve rotation; it might use shifting, flipping or combination of two or more types of movement.

Figure 8:
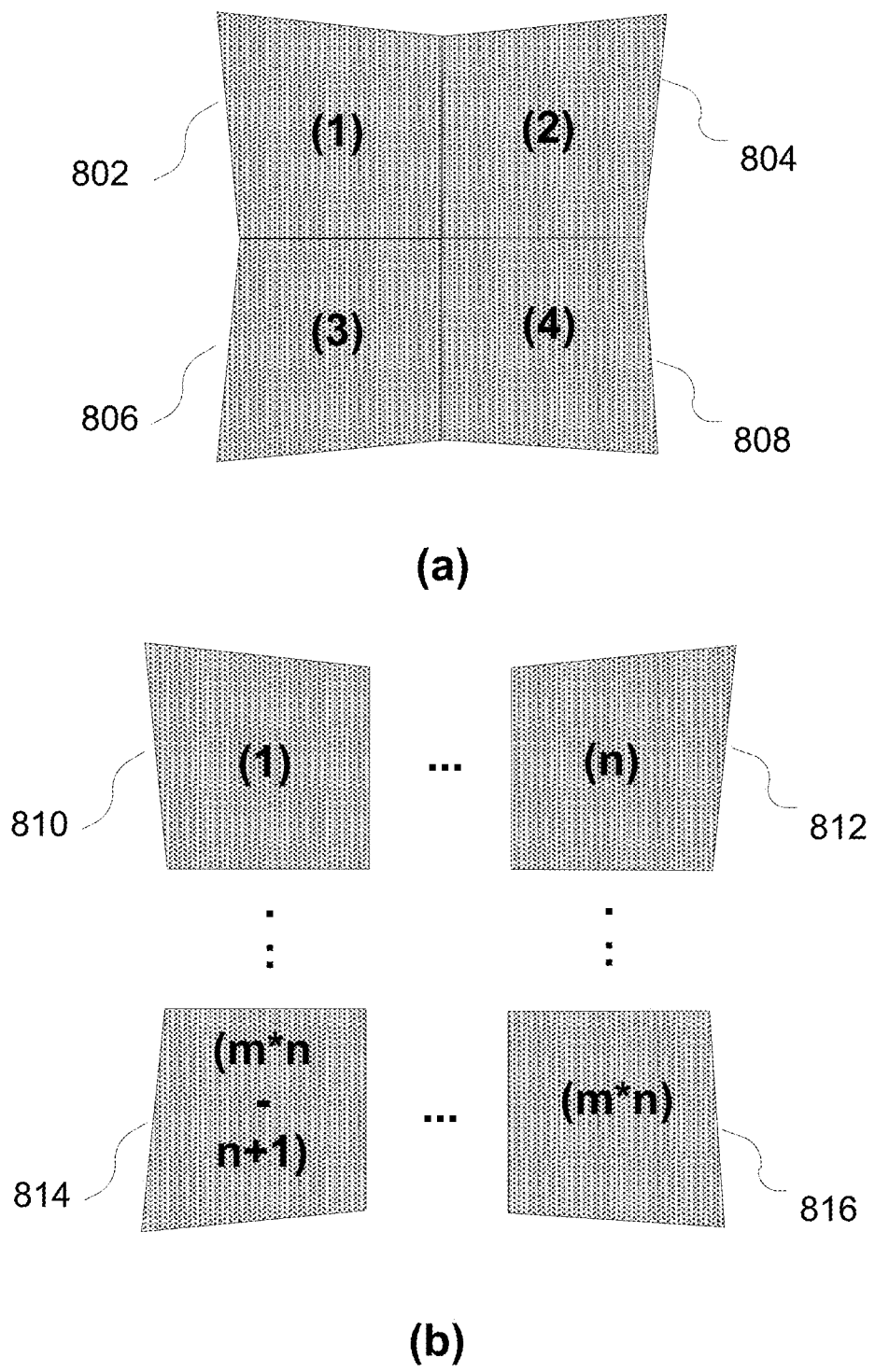
FIG. 8 illustrates an exemplary design embodiment of the optical component that works as a light field camera.

FIG. 8 illustrates an exemplary design embodiment of the optical component that works as a light field camera. With a similar structure and design described in FIG. 6 and FIG. 7, as well as in the following sections for FIG. 9 and FIG. 10, instead of having two mirrors or a prism with two reflective surfaces in the optical component, more than two mirrors or reflective surfaces are used. Without loss of generality from now on only embodiments using mirrors are mentioned for simplicity and exemplary purpose. But it is easy to extend the situation to alternative embodiments using prisms and lenses for those ordinarily skilled in the art.

The sub-Figure (a) illustrates a light field camera design embodiment of four mirrors are arranged as four quadrants in a rectangular. The first mirror 802 is in the quadrant (1). The second mirror is in the quadrant (2). The third mirror 806 is in the quadrant (3). The fourth mirror 808 is in the quadrant (4). Similarly, the sub-Figure (b) illustrates a design embodiment of m*n mirrors are arranged in a rectangular fashion. The first mirror 810 is in the top left corner (1). The nth mirror 812 is in the top right corner (2). The (mn−n+1)th mirror 814 is in the bottom left corner (3). The mnth mirror 816 is in the bottom right corner (4). So, total there are m*n mirrors in the array, where m, n are all integers starts from 1.

Each mirror forms a different image of the target scene onto the device camera sensor from a slightly different viewing direction. So, the mirror array can generate an array of images from a set of different viewing angles. This makes a light field camera. If only flat mirror is used, the generated image has a proportionally reduced field of view of the target scene. The overlapping regions among images are decreasing with the increase of the number of mirrors are used. If curved mirrors are used, the field of view of each image increases, and the overlapping regions among images also increase, however the effective resolution of each image is even more reduced. There always needs a balance to decide among the number of viewing angles (or number of images), field of view of each image and the effective resolution of each image to achieve the best overall imaging quality.

A light field camera, also known as plenoptic camera, captures information about the light field emanating from a scene; that is, the intensity of light in a scene, and also the direction that the light rays are traveling in space. This contrasts with a conventional camera, which records only light intensity. One type of light field camera uses an array of micro-lenses placed in front of an otherwise conventional image sensor to sense intensity, color, and directional information. Multi-camera arrays are another type of light field camera. Holograms are a type of film-based light field image.

In the described embodiments of the present disclosure, the mirror array records not only intensity of light in a scene and also the viewing direction. It is also equivalent to a virtual multi-camera array. The sub-Figure (a) is a four-camera array; and the sub-Figure (b) is an m*n camera array. This includes an m*n prism array or a m*n lens array is used in place of the mirror array described above.

Figure 9:
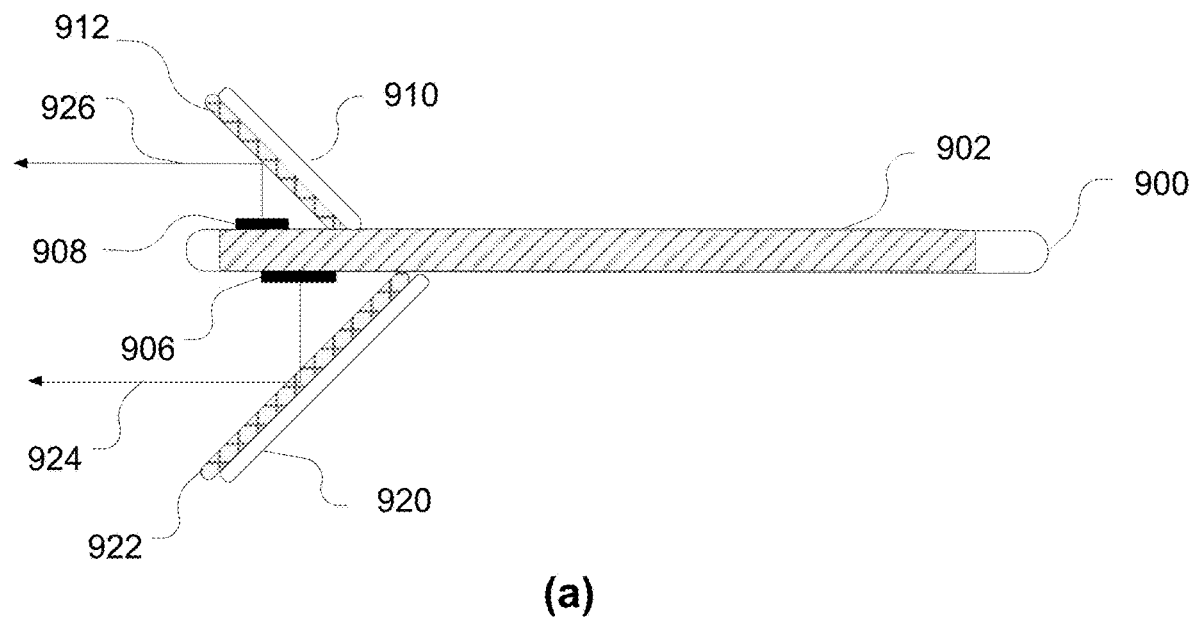
FIG. 9 illustrates an alternative design embodiment of the optical component that works as a multiple lenses stereoscopic or light field camera in its opened position.
Figure 9:
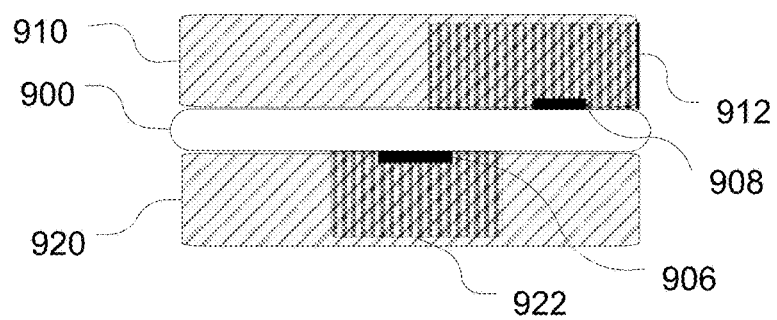
Figure 9:
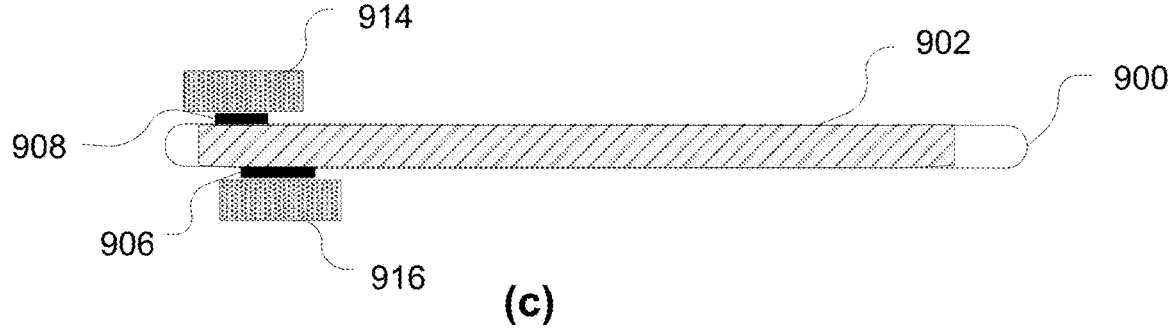

The sub-Figure (a) in FIG. 9 illustrates the side view drawing from the left side of the smart device 900 with a pair of preferred accessory plates 910 and 920 attached on. The accessory is said to be in open position when both mirror pads 912 and 922 are at 45 degree slant angle against the smart device body 900. The attaching accessory 902 is designed as a slim framework that can be securely attached to the smart device body 900 but leave all the function buttons, sensors, speakers, input ports, output ports and display screen unblocked. On the top part of this slim framework 902, there is a mirror pad 910 on the smart device front side, and another mirror pad 920 on the smart device backside. Each mirror pads 910 or 920 contains a sliding mirror 912 or 922. The mirror pad 910 is designed in a way that when mirror 912 is put in place, the lights 926 can be reflected perfectly into the front camera 908 by the mirror 912 with 45 degree slant angle against the smart device body 900; when the mirror 912 is put out place, the pad 910 appears to camera 908 as completely transparent and does not block the camera 108 at all. Similarly, the mirror pad 920 is designed in a way that when mirror 922 is put in place, the lights 924 can be reflected perfectly into the back camera 906 by the mirror 922 with 45 degree slant angle against the smart device body 900; when the mirror 922 is put out place, the pad 920 appears to camera 106 as completely transparent and does not block the camera 906 at all. In this way, when both mirror 912 and 922 are put in place, the two cameras 908 and 906 can capture the pictures of the same scene that is facing the top of the smart device 900, which is the direction both rays 924 and 926 point to. These two full resolution images from front and back cameras 908 and 906 can form a stereoscopic 3D image pair. When both mirror 912 and 922 are put out place, the two cameras 908 and 906 can work as usual as if the attaching accessory were not installed.

The sub-figure (b) of FIG. 9 illustrates the same setup and its state as in the sub-figure (a) but now it is the top view from the topside of the smart device 900. The two cameras 908 and 906 are still visible. The opened mirror pad 910 with a sliding mirror 912 is on the front side of the smart device; and the opened mirror pad 920 with a sliding mirror 922 is on the backside of the smart device. In one alternative embodiment of the present disclosure the mirrors in both sub-figure (a) and sub-figure (b) are curved surface mirrors. Yet in another alternative embodiment of the present disclosure, each of the mirrors drawn in both sub-figure (a) and sub-figure (b) comprises a set of sub-mirrors as shown and explained in FIG. 8. So, each camera can capture a set of images of the scene from a set of different viewing angles.

The sub-figure (c) of FIG. 9 illustrates an alternative design embodiment that the two optical components on the plate framework 902 are two lenses 914 and 916 instead of mirrors or prisms. The plate 902 is attached to the device body 900. The two lenses 914 and 916 are put in front of a first camera 908 and a second camera 906. The first camera 908 is a front camera of the smart device 900, and the second camera 906 is a back camera of the smart device 900. In one embodiment of the present disclosure the two lenses 914 and 916 are two wide-angle fisheye lenses.

Figure 10:
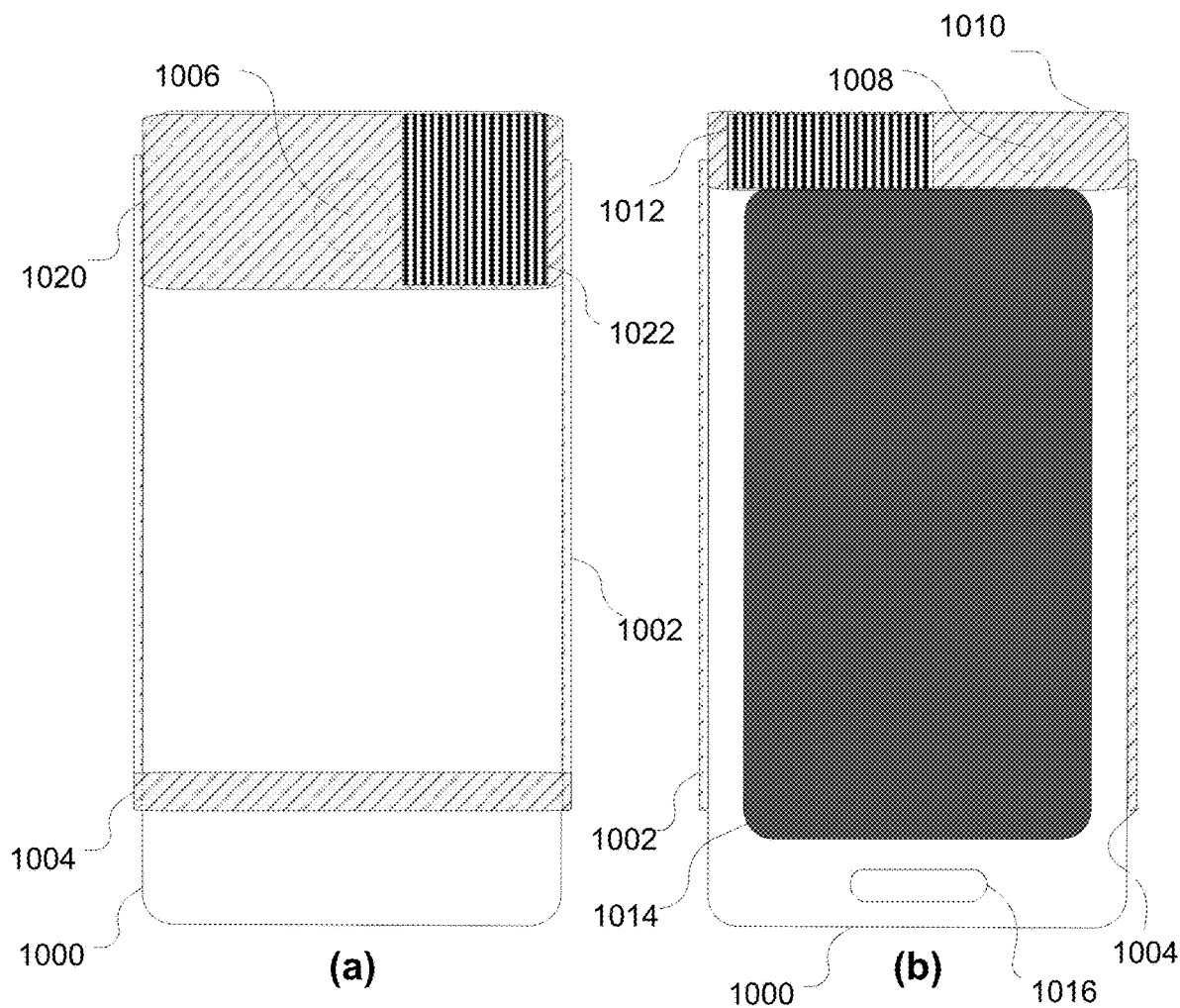
FIG. 10 illustrates an alternative design embodiment of the optical component that works as a multiple lenses stereoscopic or light field camera in its closed position.

The sub-figure (a) of FIG. 10 illustrates the same setup and its state as in the sub-figure (a) of FIG. 9 but now it is the back view from the backside of the smart device 1000. Now only back-mirror pad 1020 and back sliding mirror 1022 are visible. The back camera 1006 is visible too if the sliding mirror is out place. In this view, another piece 1004 of the slim attaching framework 1002 is visible too.

The sub-figure (b) of FIG. 10 illustrates the same setup and its state as in the sub-figure (a) of FIG. 9 but now it is the front view from the front side of the smart device 1000. Only front-mirror pad 1010 and front sliding mirror 1012 are visible. The front camera 1008 is visible too if the sliding mirror 1012 is out place. In this view, another piece 1004 of the slim attaching framework 1002 and the home button 1016 are visible too.

In one alternative embodiment of the present disclosure, the open or close state of the attaching accessory and the sliding mirror in or out place can be designed having the following relationship. Once the accessory is in open position, all sliding mirrors will automatically be put in place; once the accessory is switched to closed position, all sliding mirrors will automatically be put out place.

All mirrors mentioned hereafter are referred to high reflective first surface flat mirrors. This is purely for describing convenience and exemplary purpose but not to be regarded as limit to only flat mirrors. In more general alternative embodiments of the present disclosure, the mirrors can be parabolic or other more complicated high order surfaces to increase the camera field of view.

Figure 11:
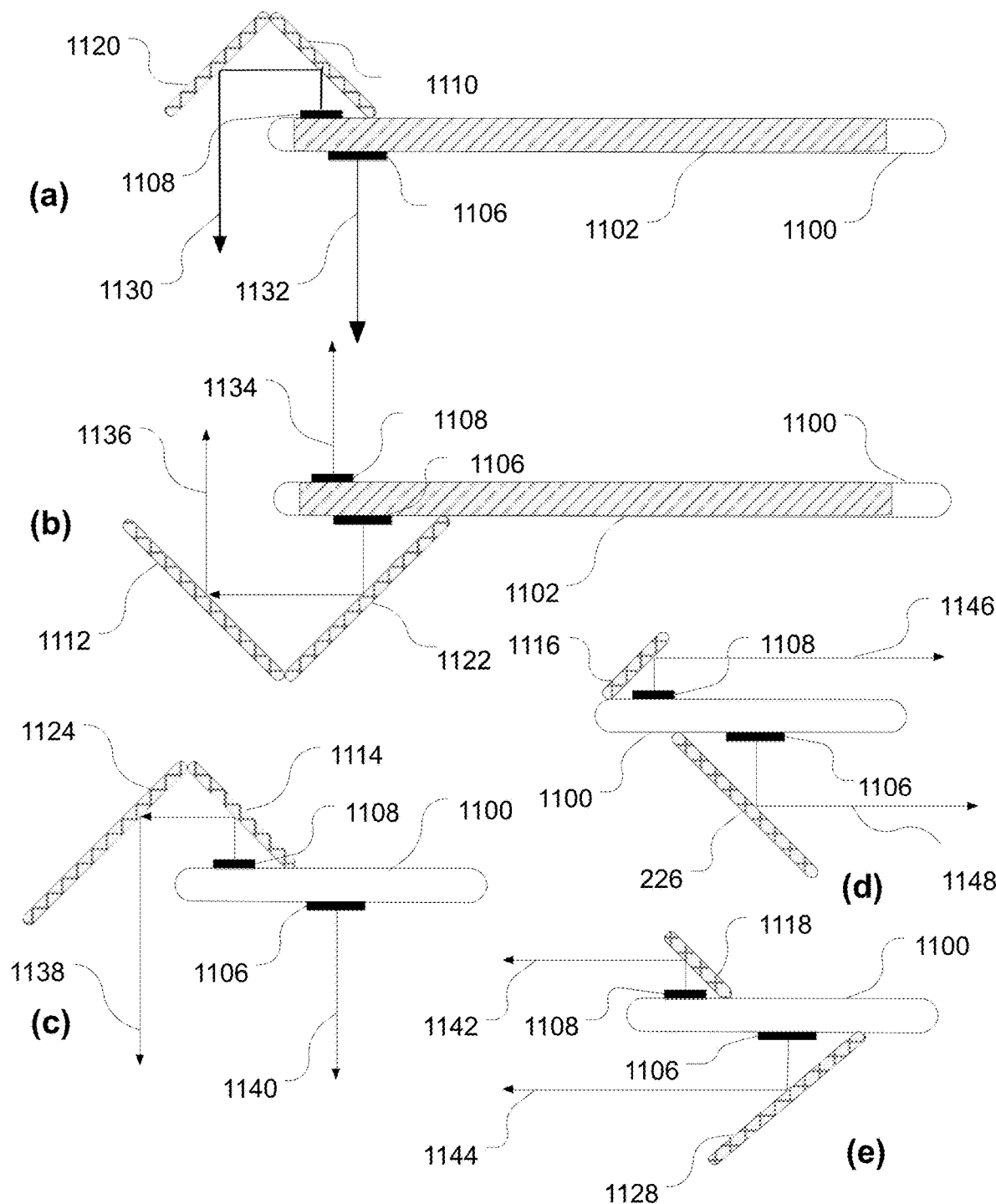
FIG. 11 illustrates five other alternative design embodiments of the optical component that work as a multiple lenses stereoscopic or light field camera in its opened position.

Additional design variants and alternative embodiments of using two existing cameras in a smart device for 3D image and video capturing are illustrated in FIG. 11. In the sub-figure (a) of FIG. 11, the front camera 1108 has the light reflected twice by two mirrors in the mirror pads 1110 and 1120 over the top of the smart device to be able capture the same scene as the back camera 1106 is capturing. The light 1130 from the same scene as the light 1132 is reflected twice to be captured by the front camera 1108. The light 1132 is captured directly by camera 1106. In this embodiment of the disclosure, the vertical disparity will increase and the mirror pads size is bigger if compared to the preferred design, which are all undesirable.

In the sub-figure (b) of FIG. 11, the back camera 1106 has the light reflected twice by two mirrors in the mirror pads 1112 and 1122 over the top of the smart device to be able capture the same scene as the front camera 1108 is capturing. The light 1136 from the same scene as light 1134 is reflected twice to be captured by the back camera 1106. The light 1134 is captured directly by front camera 1108.

In this embodiment of the disclosure, the vertical disparity and mirror pads will increase even bigger if compared to the preferred design that is also undesirable.

In the sub-figure (c) of FIG. 11, the front camera 1108 has the light reflected twice by two mirrors in the mirror pads 1114 and 1124 over the right side of the smart device to be able capture the same scene as the back camera 1106 is capturing. The light 1138 from the same scene as light 1140 is reflected twice before being captured by the front camera 1108. The light 1140 is captured directly by back camera 1106. In this embodiment of the disclosure, the vertical disparity keeps same. The horizontal disparity will increase which may be a good thing for enhanced 3D effect. But the mirror pads will become bigger depending on the actual dimension of the smart device if compared to the preferred design, which is undesirable. Similar variant of the sub-figure (d) is to have light double reflected by two mirrors over the left side of the smart device for the back camera 1106.

In the sub-figure (d) of FIG. 11, the front camera 1108 has the light 1146 reflected by a mirror in the mirror pad 1116 to be able capture the scene on the left side of the smart device. The back camera 1106 has light 1148 reflected by a mirror in mirror pad 1126 to be able capture the scene on the left side of the smart device. In this embodiment of the disclosure, the vertical disparity is the distance between two mirrors. The horizontal disparity becomes the vertical distance between two cameras.

In the sub-figure (e) of FIG. 11, the front camera 1108 has the light 1142 reflected by a mirror in the mirror pad 1118 to be able capture the scene on the right side of the smart device. The back camera 1106 has light 1144 reflected by a mirror in mirror pad 1128 to be able capture the scene on the right side of the smart device. In this embodiment of the disclosure, the vertical disparity is the distance between two mirrors. The horizontal disparity becomes the vertical distance between two cameras.

In all above descriptions of the exemplary alternative design embodiments, the front camera 1108 is assumed to be on the right side of the back camera 1106 if the display screen is facing to user. Anyone who is the ordinary skilled in the art can easily identify and make corresponding design variants when the front camera is on the opposite side of the back camera in certain other smart devices.

Generally, for those smart devices that have more than one cameras, as long as there is at least one camera in one smart device that is located on the different side of the smart device body than other cameras, one can always use a number of mirrors in the mirror pads to redirect all camera optical paths to face the same scene with or without different horizontal or vertical disparities.

Figure 12:
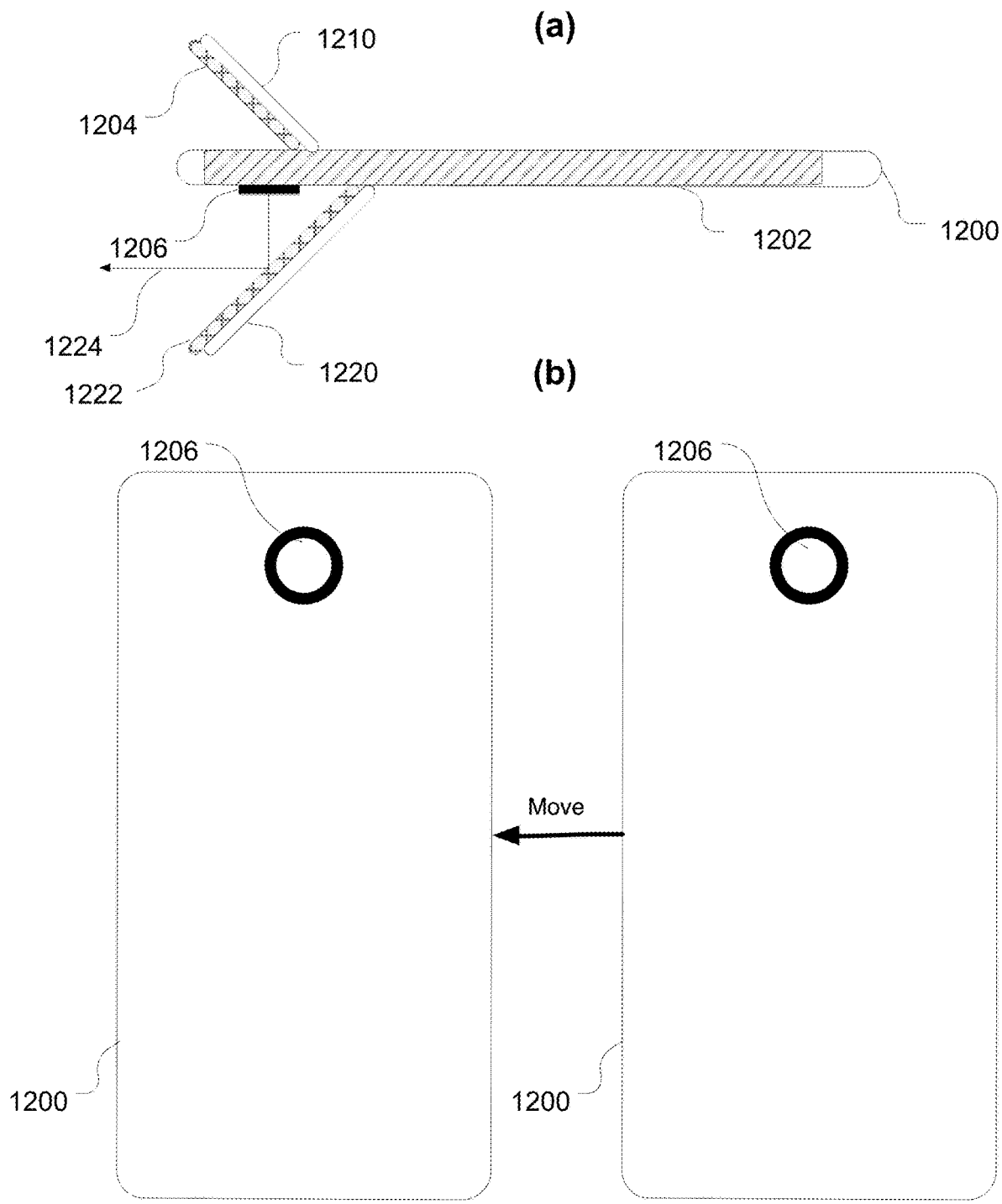
FIG. 12 illustrates the design embodiments under degenerated situations that work as a single lens stereoscopic or light field camera in its opened position.

The degenerated cases under that the present disclosure works as a single lens stereoscopic or light field camera are illustrated in FIG. 12. The first degenerated case is the smart device only has one camera 1206 but the attaching mirror accessory 1202 is available and attached, as shown in the sub-figure (a) of FIG. 12. In this case, the attaching mirror accessory is still working as usual though only one camera is used. At the beginning of the 3D capturing process, the attaching accessory should be put in open position. The front-mirror pad 1210 is not used, but the back-mirror pad 1220 is used to redirect camera 106 to shoot the scene over the top of the smart device 1200.

The second degenerated case is that the smart device only has one camera 1206 and the attaching mirror accessory 1202 is not available or not currently attached, as shown in the sub-figure (b) of FIG. 12. In this case, the camera in smart device works as same as it is normally used but follows the following special capturing process in order to capture 3D media.

The 3D image capturing process for above both degenerated cases will be software guided two consequent shootings with a horizontal shift. The single camera takes the first image, then the app software asks user to shift the device horizontally a predefined binocular distance, now the camera takes the second image. During the shifting, the realtime user guidance feature in software will be active. That is, before the time user takes the second image, the software tracks and detects the distortion and disparity in realtime, and displays the correction information on screen to guide user when to take the best second image. Not only does this feature improve the 3D media quality, but also make the capturing process much easy to use.

In all above descriptions of exemplary degenerated cases, the back camera 1206 is assumed to be the only camera in the smart device. Anyone who is ordinary skilled in the art can easily identify and make corresponding design and operating variants when the front camera is the only camera in the said smart device.

In all above design descriptions for FIGS. 9 to 12, prisms with similar reflective surfaces and characteristics or wide-angle optical lenses can be used in place of the mirrors in the designs to achieve the similar or better functions or performance. Especially in one of the exemplary embodiments of the present disclosure if two wide-angle fisheye lenses are used, each lens covers at least 180 degree of both the horizontal and vertical field of view, the first lens works with the first camera of the smart device, and the second lens works with the second camera of the smart device, then the first camera can capture everything in the front hemi-sphere of the scene, and the second camera can capture everything in the back hemi-sphere of the scene. So, the two capture streams can achieve a 360-degree VR content capturing function.

In yet another embodiment of the present disclosure, it is obvious to the ordinarily skilled in the art, if the wide-angle lenses are used together with the curved mirror designs, the above described 360-degree VR content capturing function can become 3D 360-degree VR content capturing.

In yet another embodiment of the present disclosure, no matter if the mirror array or prism or fisheye lens is used in the accessory, the camera can be used as a virtual reality camera to take fully immersive images or videos. User can hold the camera to shoot at a first direction of the target scene, then he or she turn to a second direction so that the second picture covers most scene that the first picture does not cover but there is some overlap portion between to pictures. User continue to do the capturing until the whole sphere centered at his or her location is covered with at least one captured picture. The software can analyze all the captured pictures and stitch them together to form a sphere scene. The resulted sphere image can be stored in a format called equirectangular panorama image. The format is widely used for most virtual reality data processing.

Figure 13:
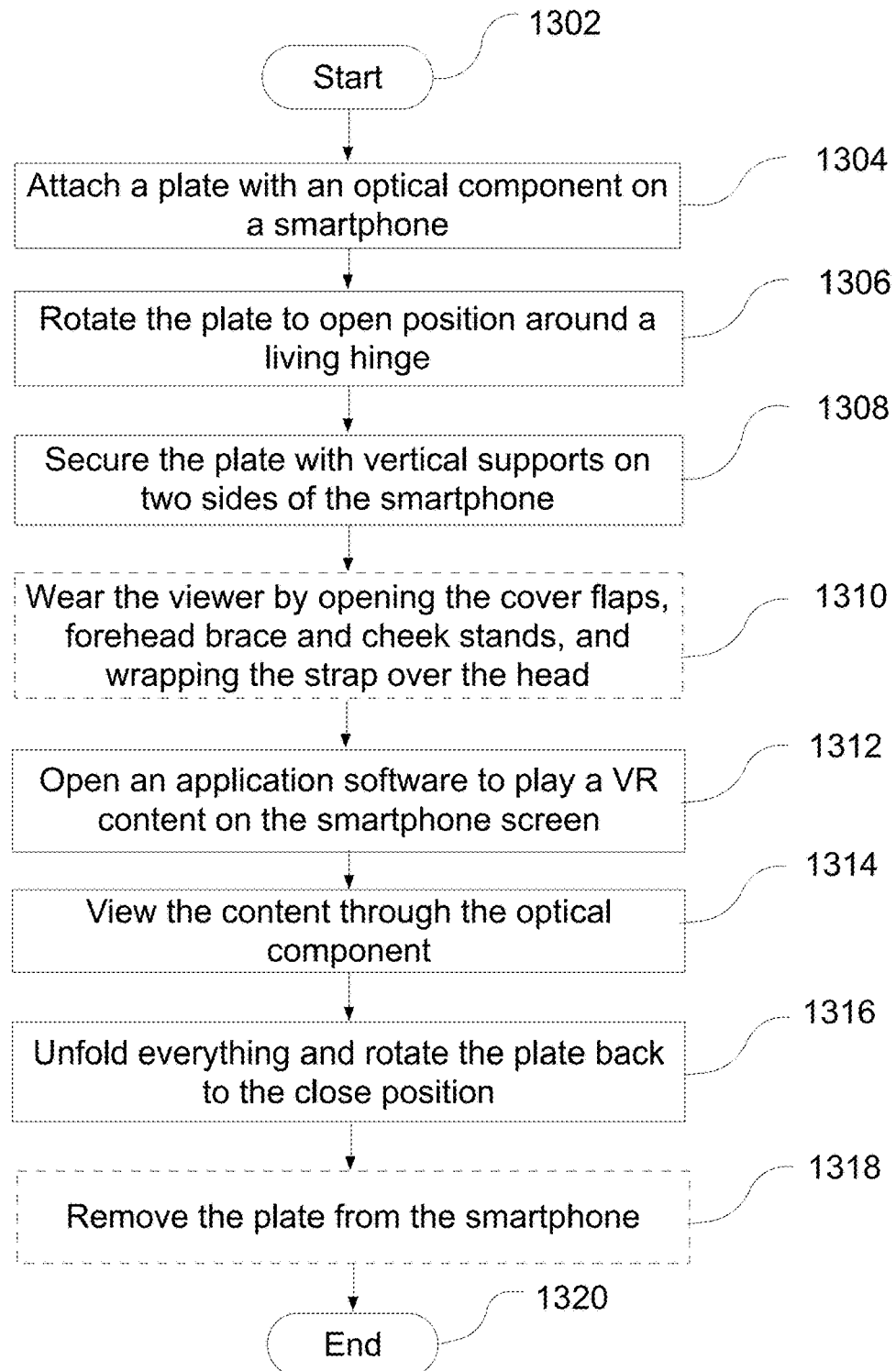
FIG. 13 illustrates an exemplary work flow diagram of the preferred method of the present disclosure as a virtual reality viewer.

FIG. 13 illustrates an exemplary high-level workflow diagram of the preferred method of the present disclosure as a virtual reality viewer. The workflow is explained with the preferred accessory design in mind. But those ordinary skilled in the art can easily extend the workflow to all other alternative accessory design variants. A user who wants to view a virtual reality content starts from 1302. The first step 1304 is to attach a plate with the optical component that described in the present disclosure to a smart device. Normally it is at the back of the smart device. In some embodiments of the present disclosure, the attachment is in form of a protective case. The user then rotates the plate around a hinge at one edge of the smart device to an open position in block 1306. In one of the embodiments of the present disclosure, this hinge is a living hinge, which can rotate a very large angle with a small footprint. In the next step in block 1308 the user secures the plate in the open position with the help from at least two vertical supporting posts sitting on at least two different sides of the smart device. It is important to support the plate in place on more than one side of the device. Because when it is in its open position the plate needs to endure wear and tear in all design embodiments and the weight of the smart device in wearable embodiments. The two sides could be the two opposite sides of the device or the adjacent two sides that forms a right angle. Three or four sides are can also be used.

For wearable design embodiments the operations in block 1310 are carried out. User wears the viewer by opening the left and right cover flaps, swinging up the forehead brace and letting out the head strap that is tied to the two ends of the forehead brace, standing up the two cheek posts if the forehead-cheek support design is used, otherwise a nose rest is used to support the whole harness on user's nose.

In the next step 1312, user opens application software to play a VR content on the smart device screen. The VR content can be distributed in form of dedicated app software or portal manager app software. Exemplary places user can have access to these apps are Apple's app store and Google's play store. A dedicated app is software made just for distributing this specific content. In this type of apps, the whole content is downloaded from the app store or play store with the software. The portal manager app software is software made for distributing many contents. This software needs only be installed once, then the content can be downloaded or streamed from the content provider's portal sites. Either way user plays a virtual reality content on the smart device screen. In one of the formats, the left eye image frame is displayed at the left half side of the screen and the right eye image frame is displayed at the right half side of the screen. With the plate being opened in front of the screen, user's left eye can watch the left half image through the first optical lens and right eye can watch the right half image through the second optical lens in the step 1314. After viewing in block 1316, user unfolds the forehead brace, as well as cheek stands if used and tucks back the strap if the step 1310 is carried out. User unfolds all the posts that support the plate and rotates the plate back to its closed position. In the final optional step 1318, user detaches the plate accessory from the smart device. If user chooses not to remove the accessory, user can continue to use the smart device normally with the accessory attached. And when user wants to use the accessory again, he or she repeats the operations starting from 1304.

Figure 14:
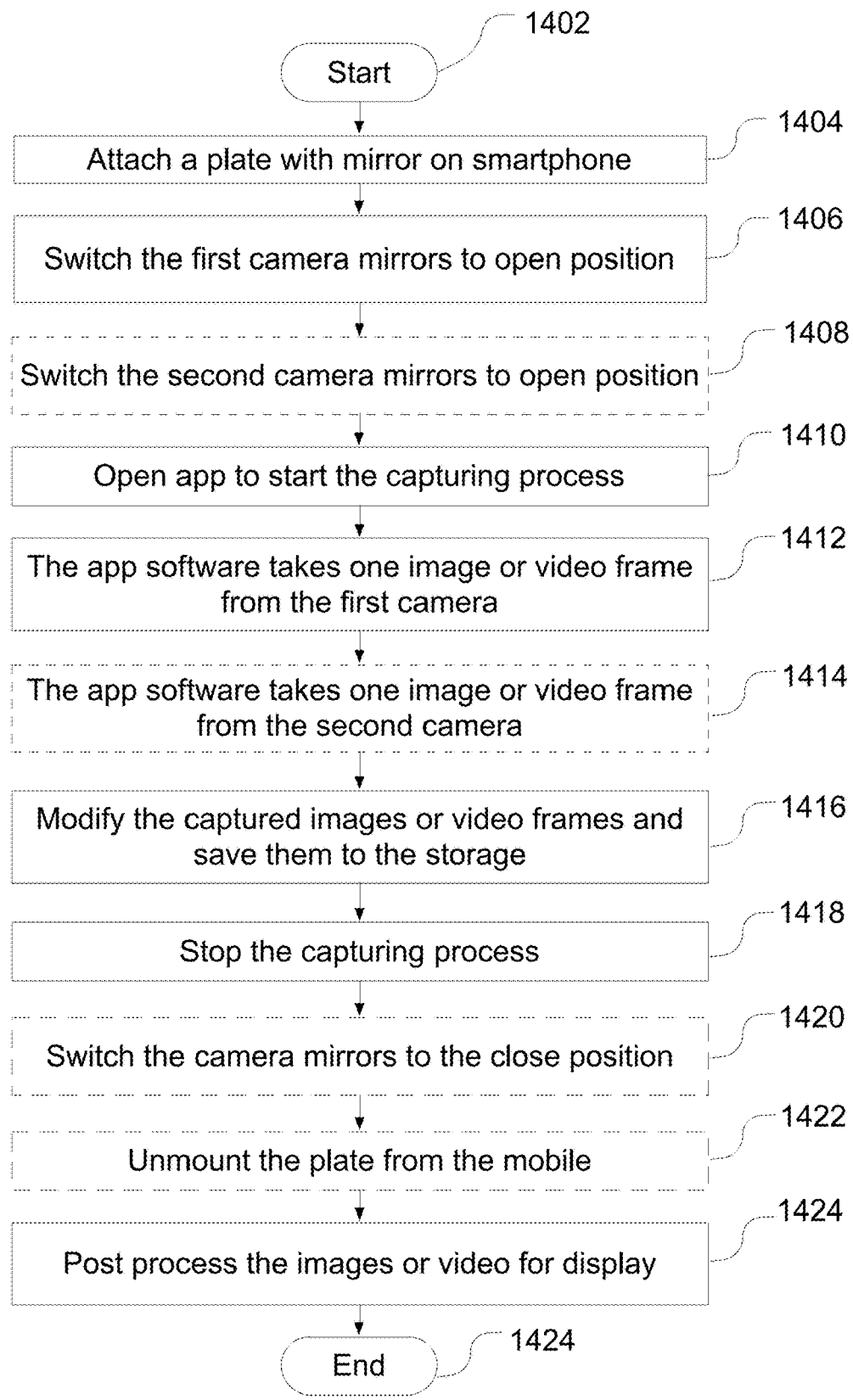
FIG. 14 illustrates an exemplary work flow diagram of the preferred method of the present disclosure as a light field camera.

FIG. 14 illustrates an exemplary work flow diagram of the preferred method of the present disclosure as a light field camera. The light field media capturing process starts at the block 1402. User needs to first mount the plate accessory on to the smart device in block 1404. Then user switches the first and the second camera mirror pads to the open position in block 1406 and 1408. The block 1408 might be optional if only one camera is available. The mirror array in the mirror pads should also be put in place; so all cameras are now capturing the same scene through the mirror arrays. User then opens the app software to control both cameras for capturing in block 1408. Once user presses software button and start the capturing. For every frame of the light field media, the app software will take first set of images or video frames from the first camera in 1410 and simultaneously take another set of images or video frames from the second camera in 1412. The app software will do a realtime quick modification to the captured two sets of images or video frames before it captures the next two sets of images or video frames. The realtime modification may include but not limited to color correction, image resizing, warping, undistortion, cropping or LUT operations or other image processing operations based on previous camera calibration or preset user configurations. After user presses button or sends a stop capturing command. The app software will stop the capturing process in block 1416. User now optionally can switch the front and back camera mirror pads to close position in block 1418. User can also optionally unmount the attaching accessory from the smart device in block 1420. At the same time of stopping the capturing process, the app software may conduct the final post processing on the images and video captured making them ready for light field display or storage or transmission as in block 1422. Other possible post processing operations are image or video enhancing filters and special effects. After the light field media gets stored or displayed or transmitted, the exemplary capturing workflow ends at block 1424.

Figure 15:
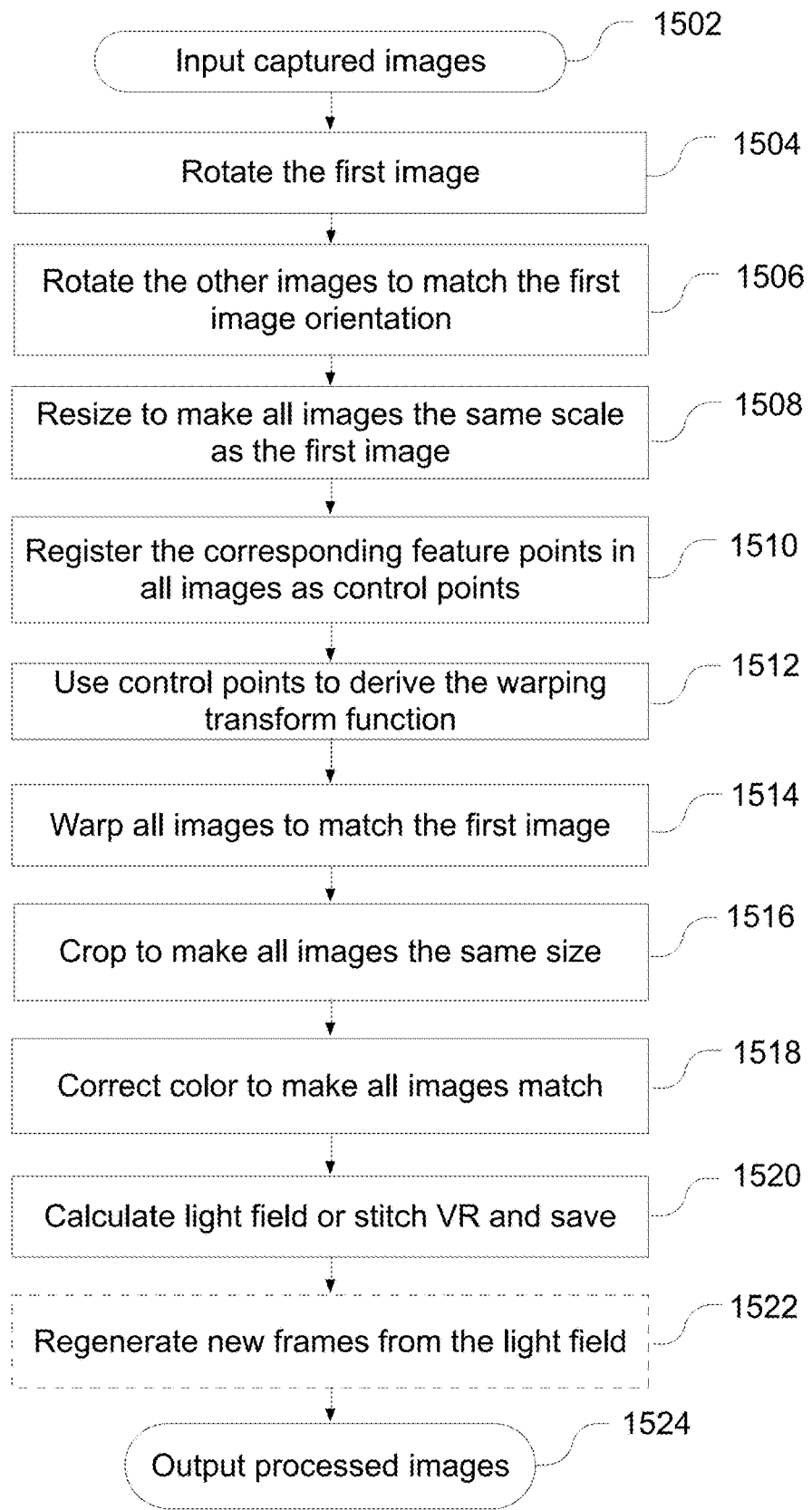
FIG. 15 illustrates an exemplary work flow diagram of a light field data processing method of the present disclosure.

FIG. 15 illustrates one example algorithm of the light field images and video processing of the present disclosure. The example algorithm was designed for the preferred accessory design. But those ordinary skilled in the art can easily extend the algorithm with modifications to other alternative accessory design variants. Once the light field media is captured and inputted at the block 1502, one of the first eye images or video frames may need to be rotated to the right position in block 1504. Then the one of the second eye images or video frames may also need to be rotated to match the orientation of the rotated first eye image or video frame in 1506. For most of smart devices, the above two captured image or video frame are of the different resolution and with the different distortion or zoom level. So at least one image or video frame needs to be resized to match the other image in terms of image scale in step 1508. The parameters to guide the scaling could be based on the previous camera calibration results or derived in realtime based on the captured data. After that a registration algorithm is used to identify distinguish feature points in both images and video frames and try to match those points. The mapped feature point pairs form a set of control points. From these control points, the vertical disparity if any can be detected and computed. The estimated vertical disparity needs to be removed or reduced from the control points mapping in 1510. From those control points the horizontal disparity can also be estimated and readjusted to the desired binocular distance value. Then the final adjusted control points can be used to derive the warping function from one image or video frame to another in block 1512. Once the warping function is calculated, one image can then be warped to march the other image pixel by pixel in 1514.

Now the two images or frames are at the same scale and with matched distortion with vertical disparity removed or reduced and horizontal disparity being optimized. Then one or two images or video frames are cropped to match each other with the exactly same image size in 1516 to form an image or video frame pair. In block 1518, the color of one image or video frame is further computed and matched to the other images or video frames in the pair.

The final matched set of images or video frame pairs are ready for calculating light field information or stitch to virtual reality images and being saved for later viewing in block 1520. A set of images or video frames captured from the design embodiments described in FIG. 6 and FIG. 7 using a single camera can be used to derive light field data or virtual reality images in the same way.

In the case of light field processing, the structure of light impinging on different sub-regions of the cameras' lens aperture can be captured. By capturing data from these multiple sub-regions, software-based image-processing techniques can be used to select image data from any sub-region within the aperture. In this way, images can be recreated that represent views of the object from different positions. If the scene depth is calculated from the raw image, each pixel can be refocused individually to give an image that is in focus everywhere. A similar type of light field-based capturing devices were firstly described in 1908 by Nobel Prize winner Gabriel Lippmann as concept of 'integral photography'.

Light field cameras also called plenoptic cameras; allow to simultaneously capture multiple images of one single scene. This rich visual material can be edited in order to pick from different possible focuses, different depths of field and even different lens apertures. However, the current software line-up would be hard-pressed to process such files due to their dimensionality and complexity. The recorded image is thus the sum of all the light rays emitted by one point over the lens aperture. Two startups, Raytix and Lytro, have made their debut on the market, unveiling the first real plenoptic cameras to speak of. In contrast to conventional cameras and their 'ordinary' lens, these innovative devices feature a digital sensor coupled with a micro-lens array containing thousands of miniature lenses. They have come to be known as light field cameras for they capture not only the intensity and the position of the light, but also the geometric distribution of the rays passing through the lens, which is lost in traditional photography. The light field—in other words the recorded flow of rays—yields a very rich description of the scene, enabling advanced creation of novel images from a single capture. It allows simulating a capture with a different focus and a different depth of field, which can help to save out-of-focus shots. It also permits simulating lenses with large aperture, which is a huge plus in low-light conditions or for creating the artistic background blur known as 'bokeh'. Similarly of interest is the possibility of producing 3D views. The light field can be seen as capturing multiple viewpoints of the scene, giving information about the parallax and depth of the scene. Considering such amazing capabilities, light field cameras in the future are likely to bring disruptive changes to the field of computational imaging with tremendous impact in a number of application domains. Having said that, the path to full deployment is strewn with several daunting hurdles. One of them is the paltry resolution of current plenoptic sensors. For instance, the recent Lytro Ilium only yields 2 megapixels images. Another barrier is the huge amount of captured high dimensional data: 4D for still image and 5D for video. It has obvious implications on the end-to-end processing chain: compression, communication and rendering. In addition to that, a third barrier relates to the possibility for the users to edit and manipulate light fields as they can today with 2D images and videos. All these obstacles translate into challenging processing problems, which need to be addressed before being able to fully exploit the potential of this technology. Such barriers cannot be effectively overcome by simply applying the models and methods, which have made the success of digital imaging in past decades.

Sparse Representations and that is precisely the purpose of CLIM (Computational Light field iMaging). It will address three specific challenges. From the very high redundancy and correlation which light fields data exhibit, it is apparent that the data have an intrinsically low-dimensional structure although they live in a high-dimensional ambient space. So, the first goal will be to develop methods to discover and characterize these lower-dimensional spaces and find sparse representations. Second challenge is designing a storage and transmission bandwidth efficient coding system that would fully exploit and preserve the geometrical models and structures of the light fields data. The third aspect regards the development of algorithms for compressed light fields computational imaging in order to enable advance features such as refocusing, perspective shifts, extended focus with high resolution, panoramic imaging and editing. Anticipating a strong impact of this research on the digital sector it will open new horizons for computational imaging applications in a variety of sectors. And five years from now, part of this work will hopefully contribute to new image standards such as JPEG-Pleno.

In one embodiment of the present disclosure, the set of multiple images captured from our methods and apparatuses, no matter from single camera or multiple cameras, are processed according to the steps from 1502 to 1518. Once all images or video frames get processed and registered, an accurate depth map can be calculated and then outputted to block 1522. Optionally the computed depth information can also be compressed, encoded and saved in the file for future use. In block 1522, a set of new images or video frames can optionally be rendered based on the depth map and one of the existing images and video frames. The newly generated images can be of new viewing directions for visualization or a recreation of the original scene after a focus adjustment. The final images of the image processing output in the block 1524.

In the case of virtual reality content processing, the captured images and video frames are analyzed and stitched together to form a sphere vision. The resulted sphere image can be stored in a format called equirectangular panorama image. The format is widely used for most virtual reality data processing. If the virtual reality content is in stereoscopic 3D pairs, the two equirectangular panorama images are generated. For transmission, the two equirectangular images can be transmitted separately in two channels or arranged in side-by-side fashion or over-and-under fashion and sent in one channel.

Figure 16:
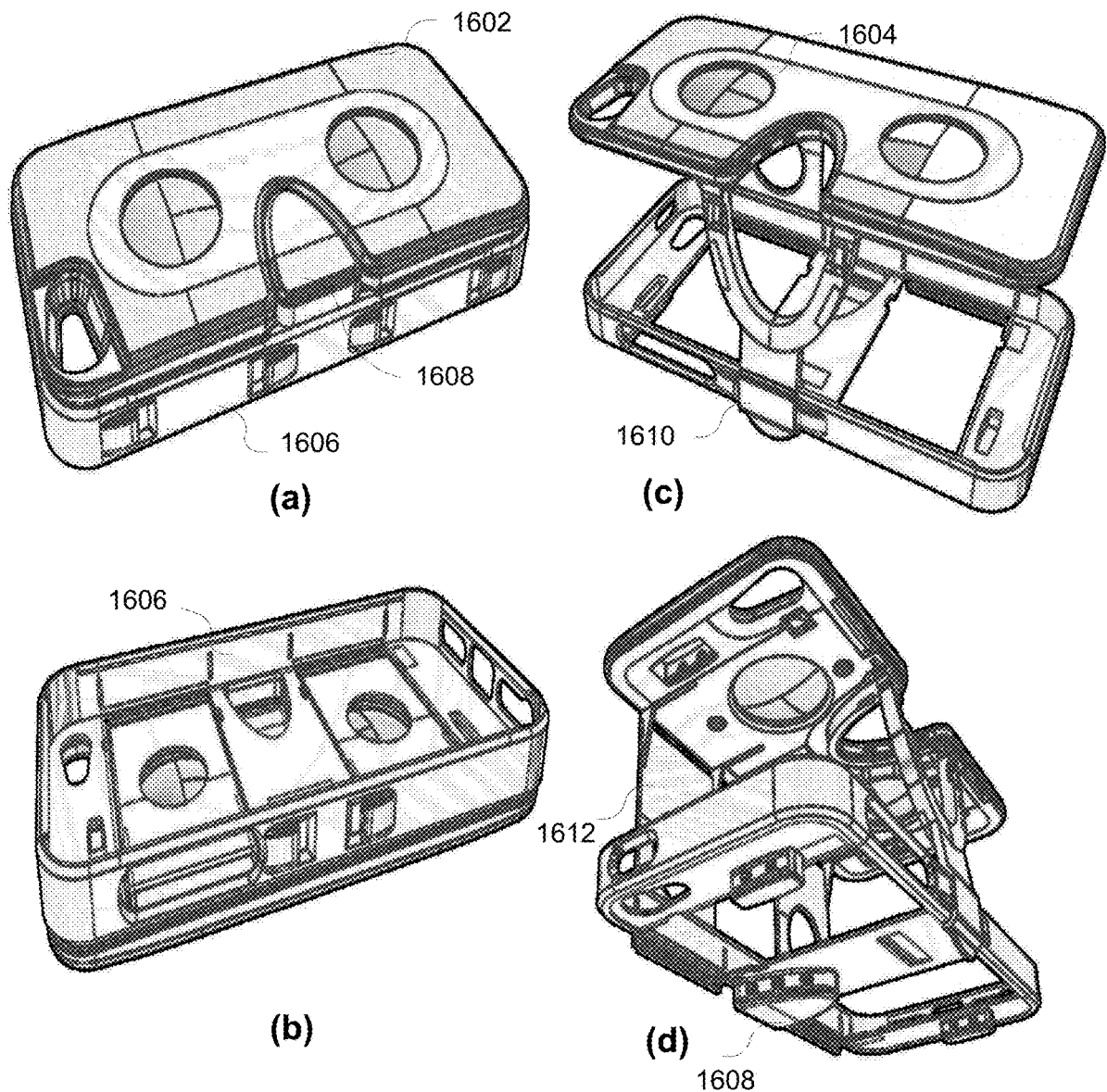
FIG. 16 illustrates an exemplary apparatus design for handheld virtual reality viewer phone case.

FIG. 16 illustrates an exemplary apparatus design for handheld virtual reality viewer in a phone case form factor according to the previous detailed description of the present disclosure. In sub-Figure (a), a thin plate 1602 is attached to the back of the smart phone case 1606. There are two convex lenses 1604 included in the thin plate 1606. 1608 is a nose cut to fit user's nose. 1608 is also a ribbon bump lock to securely lock the plate onto the phone case when the viewer is in its closed position as shown in the sub-Figure (a). The sub-Figure (b) illustrates the same closed handheld VR viewer in its upside-down position. The smartphone case 1606 is on the top and the thin plate is underneath. The phone is not shown in the drawing. The sub-Figure (c) illustrates the front view of the handheld VR viewer in its open position. The phone is not shown but the phone screen is supposed to fit into the case and facing upwards to the thin plate 1602. The plate 1602 is now supported by the Y post 1610 at the front side and two posts 1612 at the backside. The plate includes two convex VR lenses 1604 and is positioned above the phone screen. User can hold on the phone case and the plate 1602 to view the virtual reality contents displayed on the phone screen through the lenses. The sub-Figure (d) illustrates the opened viewer from the left bottom direction. The nose lock 1608 is now rotated away from the nose cut in the plate and facing down.

Figure 17:
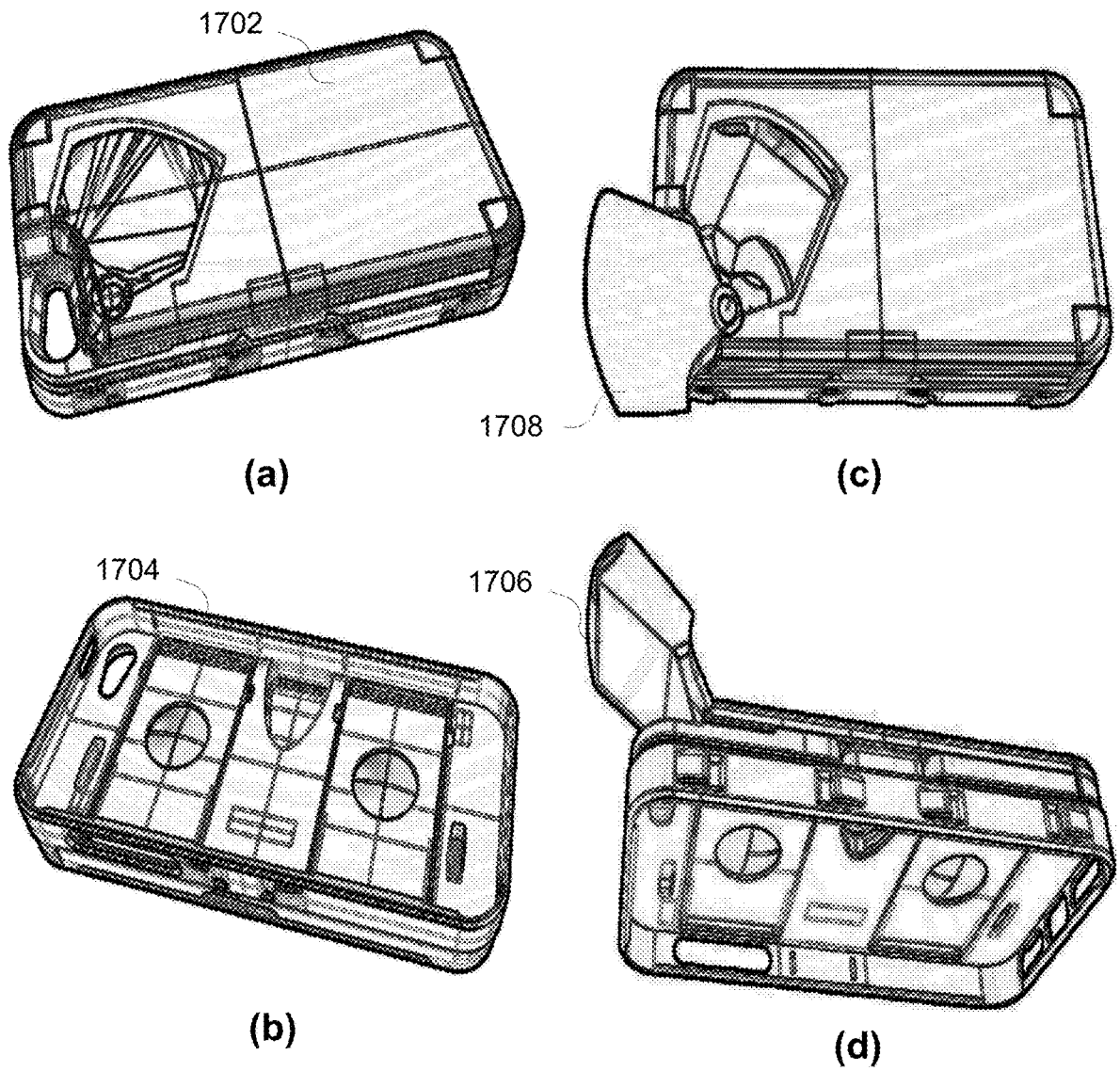
FIG. 17 illustrates an exemplary apparatus design for single lens light field camera phone case with wearable virtual reality viewer in closed position.

FIG. 17 illustrates an exemplary apparatus design for single lens light field camera phone case with wearable virtual reality viewer. As shown in the sub-Figure (a) a similar virtual reality viewer in its closed position as disclosed in the FIG. 16 is used, additionally there is another thin plate 1702 attached to the top of it. The 1702 plate includes a light field optical component 1708 at the end closer to the smartphone back camera. The sub-Figure (b) illustrates the same apparatus in upside-down position. The phone case 1704 is visible without a phone being attached. The sub-Figure (c) illustrates the light field camera component 1708 is in its open position when VR viewer remains closed. The optical component 1708 is swung up from inside the plate to on top of the back camera. The sub-Figure (d) illustrates the opened light field optics 1706, which is on the other side of 1708, is facing the camera lens. The whole apparatus is looked from the left bottom direction.

Figure 18:
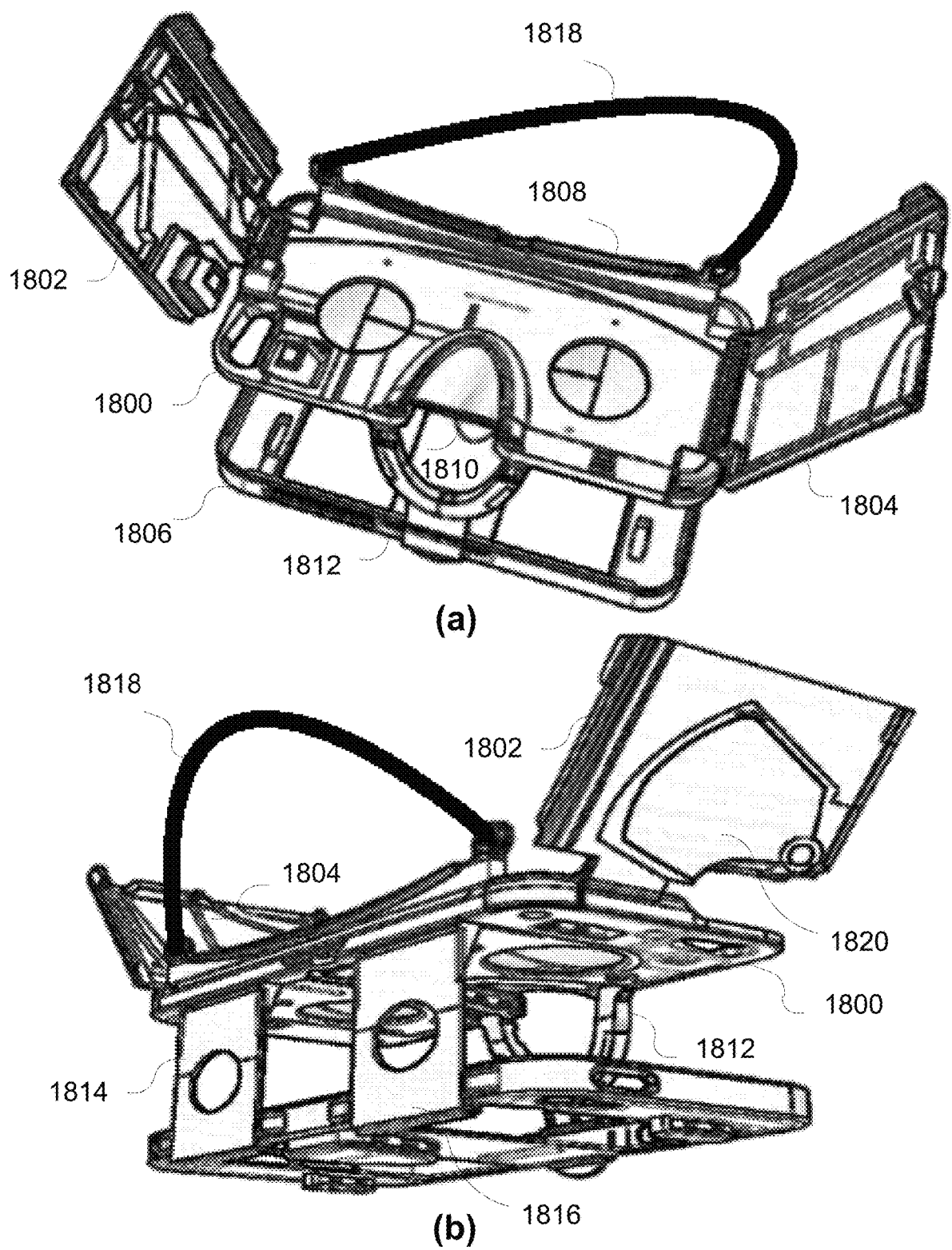
FIG. 18 illustrates an exemplary apparatus design for wearable virtual reality viewer phone case in fully open position.

FIG. 18 illustrates an exemplary apparatus design for wearable virtual reality viewer phone case in fully opened position. Sub-Figure (a) shows the apparatus from the top view. The plate 1800 is opened up facing the front screen of the phone. The left flap 1802 and the right flap 1804 are opened to block user's peripheral vision. The forehead brace 1808 is opened up to support on user's forehead. The strap 1818 is tied on the both ends of the forehead brace 1808. The strap 1818 can be wrapped around user's head. It can also be tugged under the left flap 1802 and the right flap 1804 when they are closed. The nose rest 1810 has a curved padded surface to support on user's nose. The phone case 1806 holds and protects the phone. Sub-Figure (b) illustrates the opened apparatus from the side view. It clearly shows the left flap 1802 and right flap 1804 are opened up. The brace 1808 is standing up for supporting on user's forehead. The strap 1818 is tied on the both ends of the forehead brace 1808. The light field optical component 1820 is swung back inside the flap 1802. The Y post 1812 supports the opened plate 1800 from the left side of the phone, the two flat posts 1814 and 1816 support the plate from the right side of the phone. The claw of the Y post 1812 grips the phone case 1806 on the side. The bottom of the two flat posts 1814 and 1816 has a specially designed living hinge to help the posts 1814 and 1816 to rotate 270 degrees from the closed position to the opened position. The Y post 1812 and two flat posts 1814, 1816 securely support the lens plate 1800 to be parallel above the phone screen with a fixed viewing distance at about 39 mm to 45 mm. The viewing distance is roughly the focal length of the convex lenses included in the plate 1800.

A light field, stereoscopic 3D and virtual reality media data sharing system can also be built. The high dimensional image and video data sharing will be mostly over the cloud. A set of central cloud high dimensional image and video sharing, editing, displaying and searching web services are linking all the users through Internet connection. The users include the different smart mobile device users as well as wired linked computers. User A is a smart mobile user who has a mobile light field and virtual reality camera as described in the previous sessions of the present disclosure and a mobile local storage. The mobile camera stores captured data in the local storage. Similarly, the user B is another smart mobile user who has a mobile light field and virtual reality camera as described in the previous sessions of the present disclosure and a mobile local storage. The mobile camera stores captured data in the local storage. Both user A and user B not only can share the captured high dimensional media with all other subscribed users, but also can send the data to each other directly via peer-to-peer sharing connection. The cloud services connect to cloud storage with all the data managed in a database management system. A cloud based high dimensional media data post processing service can also be added between the front-end cloud services and the cloud storage. The cloud post processing services may conduct realtime or offline processing jobs to improve the high dimensional media data for the service users.

A social networking system on the top of the above high dimensional media sharing service can be set up. The high dimensional image and video social networking services are over the cloud. A set of central chatting, messaging, conferencing and networking web services using high dimensional image and video are linking all the users through Internet connection. The users include the different smart mobile device users as well as wired linked computers. User A is a smart mobile user who has a mobile light field and virtual reality camera as described in the previous sessions of the present disclosure and a mobile local storage. The mobile camera stores captured data in the local storage.

Similarly, the user B is another smart mobile user who has a mobile light field and virtual reality camera as described in the previous sessions of the present disclosure and a mobile local storage. The mobile camera stores captured data in the local storage. Both user A and user B not only can network with all other subscribed users, but also can call or send message to each other directly via peer-to-peer communication path. The cloud services connect to cloud storage with all the data managed in a database management system. A cloud based high dimensional media data post processing service can also be added between the front-end cloud services and the cloud storage. The cloud post processing services may conduct realtime or offline processing jobs to improve the high dimensional media data for the service users.

The invention claimed is:

1. A method of adding an imaging capability to a smart mobile device with an initial imaging capability, comprising:
   attaching a protective case to the smart mobile device;
   providing a plate with a plurality of optical elements in a first position;
      wherein the plate is installed initially at the back of the smart mobile device and can be moved or rotated from the back of the smart mobile device to the front;
      wherein the plurality of optical elements, plate, and device form a first imaging structure;
      wherein a first locking mechanism is used to lock the plate and case;
   rotating the plate around a living hinge at an edge of the case to a second position;
      wherein the plate is supported by a first post on a first edge and a second post on a second edge of the case;
      wherein a second locking mechanism is used to lock the plate and case;
      wherein the plurality of optical elements, plate, and device form a second imaging structure;
   wherein the first imaging structure is used to capture or display images from a first viewing position; and the second imaging structure is used to capture or display images from a second viewing position.

2. The method of claim 1, wherein the living hinge includes a structure of three sequential sub living hinges that each rotates an angle for a total of about 270 degrees.

3. The method of claim 1, wherein at the second position, the plate includes a mechanic structure to support itself on the user's nose.

4. The method of claim 1, wherein at the second position, the plate includes a mechanic structure to support itself on the user's forehead.

5. The method of claim 1, wherein at the second position, the plate includes a mechanism to support itself on the user's left and right cheeks.

6. The method of claim 1, wherein at the second position, the plate includes a strap that wraps around the user's head.

7. The method of claim 6, wherein the strap is retractable and embedded in the plate when it is not used.

8. The method of claim 1, wherein at least one of the locking mechanisms between the plate and case includes two locking sides, comprising:
   a resilient ribbon structure with at least one bump on the first locking side;
   a dent matching the bump on the second locking side.

9. The method of claim 1, wherein the plurality of optical elements includes at least one convex lens.

10. The method of claim 1, further comprising:
    providing a second plate with a second plurality of optical elements in the case at a third position;
       wherein the second plurality of optical elements, plate, and device form a third imaging structure;
    moving the second plate to a fourth position;
       wherein the second plurality of optical elements, plate, and device form a fourth imaging structure;
    wherein the fourth structure completes the third to realize a second added imaging capability.

11. The method of claim 10, further comprising:
    providing a third plate with a third plurality of optical elements in the case at a fifth position;
       wherein the third plurality of optical elements, plate, and device form a fifth imaging structure;
    moving the third plate to a sixth position;
       wherein the third plurality of optical elements, plate, and device form a sixth imaging structure;
    wherein the sixth structure completes the fifth to realize the second added imaging capability.

12. The method of claim 10, wherein the plurality of optical elements includes at least one piece of reflective glass, mirror, or prism.

13. The method of claim 12, wherein an array of reflective glass segments, mirrors, lenses, fisheyes, or prisms are used. Each optical component forms an image of a scene object at a different viewing angle.

14. The method of claim 10, wherein the third imaging structure is used to capture images from a first viewing angle and the fourth imaging structure is used to capture images from a second viewing angle.

15. The method of claim 11, wherein the fifth imaging structure is used to capture images from a third viewing angle and the sixth imaging structure is used to capture images from a fourth viewing angle.

16. The method of claim 15, wherein the second plate is working with a first imaging sensor of the device and the third plate is working with a second imaging sensor of the device, if any.

17. An apparatus for adding an imaging capability to a smart mobile device with an initial imaging capability, comprising:
    a protective case for the device;
    a plate in the case;
       wherein the plate is installed initially at the back of the smart mobile device and can be moved or rotated from the back of the smart mobile device to the front;
       wherein the plate includes a plurality of optical components;
       wherein the plurality of optical components, plate, and device form a first imaging structure at a first position;
       wherein the plate can be rotated around at least one living hinge at an edge of the case to a second position;
       wherein the plate is supported by a first post on a first edge and a second post on a second edge of the case at the second position;
       wherein at least one of the locking mechanisms is used to lock the plate and case;
       wherein the plurality of optical components, plate, and device form a second imaging structure at the second position;
    wherein the first imaging structure is used to capture or display images from a first viewing position; and the second imaging structure is used to capture or display images from a second viewing position.

18. An apparatus of claim 17,
wherein the plurality of optical components may include a convex lens;
wherein the living hinge may include three sub living hinges that each rotates an angle for a total of about 270 degrees;
wherein the plate may be worn on the user's head by resting a mechanic structure on the forehead and a strap over the head;
wherein the plate may be supported by at least two stands resting on the user's left and right cheeks and/or left and right side of the nose, respectively.

19. An apparatus of claim 18, further comprising a second and/or third plate with a second and/or third plurality of optical elements, respectively;
wherein the second plurality of optical elements, second plate, and device form a third imaging structure and/or the third plurality of optical elements, third plate, and device form a fourth imaging structure at two initial positions;
wherein the second and/or third plate can be rotated to two different positions on the device;
wherein the second plurality of optical elements, second plate, and device form a fifth imaging structure and/or the third plurality of optical elements, third plate, and device form a sixth imaging structure at the two different positions;
wherein all the imaging structures at the different position complete those at the initial position to realize a second added imaging capability.

20. An apparatus and system of claim 19,
wherein the plurality of optical components may include an array of reflective glass, mirrors, lens, fisheyes, or prisms; each optical component may form an image of a scene object at a different viewing angle;
wherein the second plate may be working with a first imaging sensor of the device and the third plate may be working with a second imaging sensor of the device, if any;
wherein the third imaging structure may be used to capture an image from a first viewing angle and the fourth imaging structure may be used to capture an image from a second viewing angle; the fifth imaging structure may be used to capture an image from a third viewing angle and the sixth imaging structure may be used to capture an image from a fourth viewing angle, if they are available;
wherein light field information of the scene object may be captured, processed, derived, and stored by taking images from the various viewing angles.

* * * * *